United States Patent
Benosman et al.

(10) Patent No.: US 11,840,224 B2
(45) Date of Patent: *Dec. 12, 2023

(54) APPARATUS AND METHOD FOR CONTROL WITH DATA-DRIVEN MODEL ADAPTATION

(71) Applicant: Mitsubishi Electric Research Laboratories, Inc., Cambridge, MA (US)

(72) Inventors: Mouhacine Benosman, Boston, MA (US); Ankush Chakrabarty, Cambridge, MA (US); Saleh Nabi, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 922 days.

This patent is subject to a terminal disclaimer.

(21) Appl. No.: 16/824,949

(22) Filed: Mar. 20, 2020

(65) Prior Publication Data

US 2021/0291826 A1    Sep. 23, 2021

(51) Int. Cl.
*B60W 30/095*  (2012.01)
*G06N 20/00*  (2019.01)
(Continued)

(52) U.S. Cl.
CPC ........ *B60W 30/0956* (2013.01); *B60W 30/12* (2013.01); *B60W 30/16* (2013.01);
(Continued)

(58) Field of Classification Search
CPC .. B60W 30/0956; B60W 30/12; B60W 30/16; G05B 13/04; G05B 17/00;
(Continued)

(56) References Cited

U.S. PATENT DOCUMENTS

2021/0191343 A1*  6/2021  Lee .......................... F24F 11/30

FOREIGN PATENT DOCUMENTS

WO     2019181038      9/2019

OTHER PUBLICATIONS

Benosman et al. Robust POD model stabilization for the 3D boussinesq equation s based on Lyapunov theory and extremum seking, 2017 American Control Cong. May 24, 2017. pp. 1827-1832.

(Continued)

*Primary Examiner* — Chad G Erdman
(74) *Attorney, Agent, or Firm* — Gennadiy Vinokur; Hironori Tsukamoto

(57) ABSTRACT

An apparatus for controlling an operation of a system is provided. The apparatus comprises an input interface configured to receive a state trajectory of the system, and a memory configured to store a model of dynamics of the system including a combination of at least one differential equation and a closure model. The apparatus further comprises a processor configured to update the closure model using reinforcement learning (RL) having a value function reducing a difference between a shape of the received state trajectory and a shape of state trajectory estimated using the model with the updated closure model, and determine a control command based on the model with the updated closure model. Further, the apparatus comprises an output interface configured to transmit the control command to an actuator of the system to control the operation of the system.

20 Claims, 22 Drawing Sheets

(51) Int. Cl.
  *B60W 30/12* (2020.01)
  *B60W 30/16* (2020.01)
  *G06V 20/58* (2022.01)
  *G06N 3/08* (2023.01)
  *G05B 13/04* (2006.01)
  *G05B 17/00* (2006.01)
  *G05B 17/02* (2006.01)

(52) U.S. Cl.
  CPC .............. *G05B 13/04* (2013.01); *G05B 17/00* (2013.01); *G05B 17/02* (2013.01); *G06N 3/08* (2013.01); *G06N 20/00* (2019.01); *G06V 20/58* (2022.01)

(58) Field of Classification Search
  CPC ............ G05B 17/02; G05B 2219/2614; G05B 13/042; G05B 13/0265; G06N 3/08; G06N 20/00; G06V 20/58
  See application file for complete search history.

(56) References Cited

OTHER PUBLICATIONS

Omer et al. Neural network closures for nonlinear model order reduction. ARXIV.org. cornell university library. May 23, 2017.

\* cited by examiner

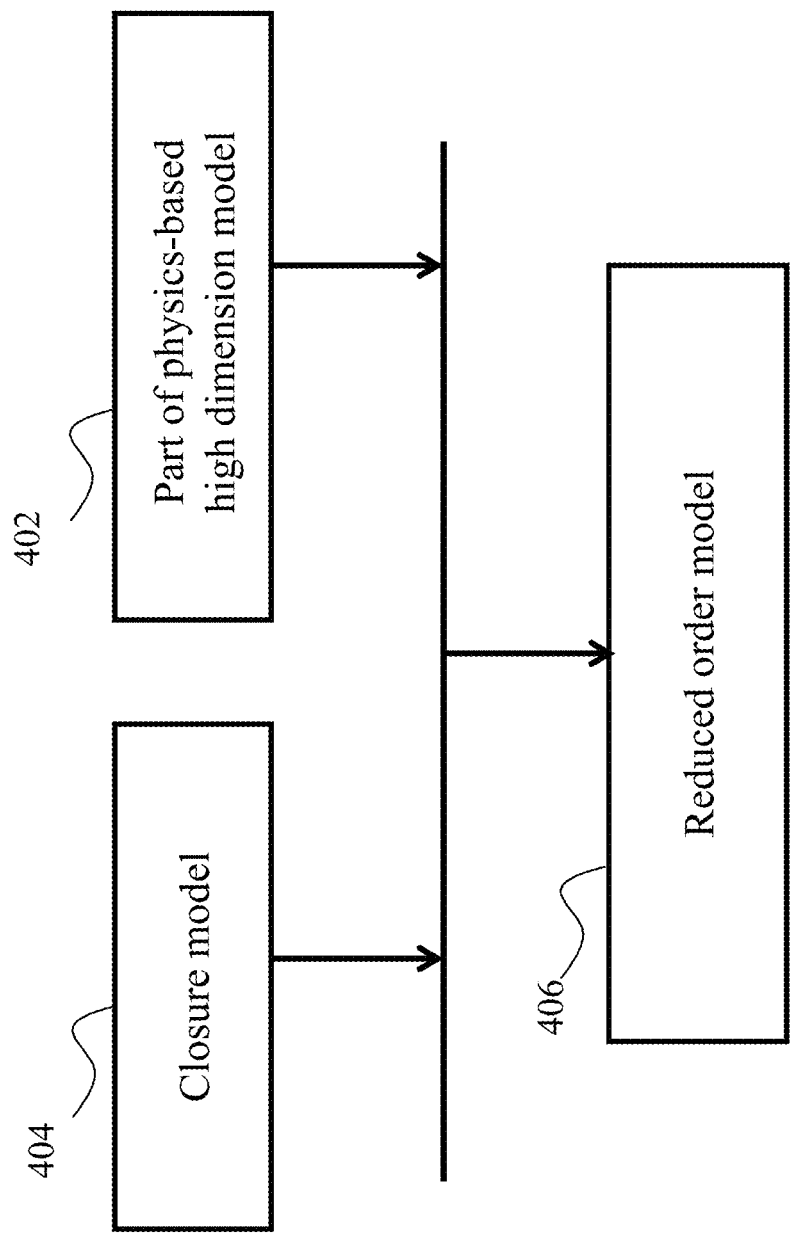

APPARATUS AND METHOD FOR CONTROL WITH DATA-DRIVEN MODEL ADAPTATION

TECHNICAL FIELD

The invention relates generally to system modelling and control, and more particularly to a method and an apparatus for data-driven model adaptation with reinforcement learning to model, simulate and control a machine.

BACKGROUND

Control theory in control systems engineering is a subfield of mathematics that deals with the control of continuously operating dynamical systems in engineered processes and machines. The objective is to develop a control policy for controlling such systems using a control action in an optimum manner without delay or overshoot and ensuring control stability.

For example, optimization-based control and estimation techniques, such as model predictive control (MPC), allow a model-based design framework in which the system dynamics and constraints can directly be taken into account. The MPC is used in many applications to control the dynamical systems of various complexities. Examples of such systems include production lines, car engines, robots, numerically controlled machining, motors, satellites and power generators. As used herein, a model of dynamics of a system or a model of a system describes dynamics of the system using differential equations. For example, the most general model of a linear system with p inputs u, q outputs y and n state variables x is written in the following form:

$$\dot{x}(t)=A(t)x(t)+B(t)u(t)$$

$$y(t)=C(t)x(t)+D(t)u(t).$$

However, in a number of situations, a model of the controlled system is nonlinear and can be difficult to design, to use in real-time, or can be inaccurate. Examples of such cases are prevalent in robotics, building control (HVAC), smart grids, factory automation, transportation, self-tuning machines, and traffic networks. In addition, even if the nonlinear model is exactly available, designing an optimal controller is essentially a challenging task since a partial differential equation, named Hamilton-Jacobi-Bellman (HJB) equation, needs to be solved.

In absence of accurate models of the dynamical systems, some control methods exploit operational data generated by dynamical systems in order to construct feedback control policies that stabilize the system dynamics, or embed quantifiable control-relevant performance. The use of operational data to design the control policies is called data-driven control. There are two kinds of data-driven control methods: (i) indirect methods that first construct a model of the system and then leverage the model to design controllers, and (ii) direct methods that directly construct control policies from the data without the intermediate model-building step.

A drawback of indirect methods is potential requirement of large quantities of data in the model-building phase. In addition, in the indirect control methods, the controller is computed from the estimated model, e.g., according to the certainty equivalence principle, but in practice the models estimated from the data do not capture the physics of dynamics of the system. Hence, a number of model based control techniques cannot be used with such data-driven models.

To overcome this problem, some methods use the direct methods of control to map the experimental data directly onto the controller, without any model to be identified in between. However, the direct methods of control results in a black box design of a control policy that maps a state of the system directly to control commands. However, such a control policy is not designed in consideration of the physics of the system. In addition, a control designer is not able to influence the data-driven determination of the control policy.

Therefore, there is still a need for a method and an apparatus for controlling the system in an optimum manner.

SUMMARY

It is an object of some embodiments to provide an apparatus and a method for data-driven design of a model of dynamics of a system to generate a model of dynamics of a system that capture physics of behavior of the system. In such a manner, the embodiments simplify model design process, while retaining advantages of having a model of the system in designing control applications. However, current data-driven methods are not suitable for estimating the model of the system that captures the physical dynamics of the system.

For example, reinforcement learning (RL) is an area of machine learning concerned with how to take actions in an environment so as to maximize some notion of cumulative reward (or equivalently, minimize a cumulative loss/cost). The reinforcement learning is related with optimal control in continuous state-input spaces, which is concerned mostly with existence and characterization of optimal control policies, and algorithms for their computation in the absence of a mathematical model of the controlled system and/or environment.

In view of the advantages offered by the RL methods, some embodiments aim to develop RL techniques that result in optimal control policies for dynamical systems that can be described with differential equations. However, a control policy maps the state of the system to a control command and does not or at least does not have to perform this mapping based on the physical dynamics of the system. Hence, the RL-based data-driven estimation of a model, with physical meaning, having one or multiple differential equations to describe the dynamics of the system is unexplored by the control community.

Some embodiments are based on realization that RL data-driven learning of the model of dynamics of the system, with physical meaning, can be seen as a virtual control problem where a reward function is a minimization of a difference between behavior of the system according to the learned model and the actual behavior of the system. Notably, the behavior of the system is a high level characterization of the system, e.g., stability of the system, boundedness of the states. Indeed, a system has behavior even in uncontrolled situations. Unfortunately, an estimation of such a model through RL is computationally challenging.

To that end, some embodiments are based on the recognition that a model of a system can be represented with a reduced order model combined with a virtual control term, we call a closure model. For example, if the full physic-based model of the system is typically captured by a partial differential equation (PDE), the reduced order model can be represented by an ordinary differential equation (ODE). The ODE represents dynamics of the system as a function of time, but less accurately than the representation of dynamics using PDE. Hence, the objective of closure model is to reduce this gap.

As used herein, a closure model is a nonlinear function of a state of a system capturing a difference in behavior of the system estimated by the ODE and the PDE. Hence, the closure model is also a function of time representing a difference of dynamics between dynamics captured by the ODE and the PDE. Some embodiments are based on understanding that representation of dynamics of the system as a combination of the ODE and the closure model can simplify subsequent control of the system, because solving the PDE equations is computationally expensive. Therefore, some embodiments are trying to simplify the data-driven estimation of dynamics of the system by representing the dynamics with the ODE and the closure model and updating only the closure model. However, this problem, while computationally simpler, is also challenging when formulated in a framework of the RL. This is because usually the RL is used to learn a control policy to control the system precisely. Here, in this analogy, the RL should try to estimate the closure model precisely, which is challenging.

However, some embodiments are based on the realization that in a number of modelling situations it is sufficient to represent a pattern of behavior of the dynamics of the system, and not the exact behavior itself. For example, when the exact behavior capture energy of the system at each point of time, the pattern of the behavior captures rate of change of the energy. As an analogy, when the system is excited the energy of the system increases. Knowing the exact behavior of the dynamics of the system allows to evaluate such an energy increase. Knowing the pattern of the behavior of the dynamics of the system allows to evaluate a rate of increase to estimate a new value of the energy proportional to its actual value.

Thus, the pattern of the behavior of the dynamics of the system is not the exact behavior itself, however, in a number of model-based control applications, the pattern of the behavior of the dynamics of the system is sufficient to design Lyapunov stable control. Examples of such control applications include stabilization control aiming to stabilize a state of the system.

To that end, some embodiments use RL to update the closure model such that dynamics of the ODE and the updated CL mimics the pattern of dynamics of the system. Some embodiments are based on realization that the pattern of dynamics can be represented by a shape of state trajectory determined as a function of time, as contrasted with values of the state of the system. The state trajectory can be measured during online functioning of the system. Additionally, or alternatively, the state trajectory can be simulated using the PDE.

To that end, some embodiments control the system using a model of the system including a combination of ODE and a closure model and update the closure model with RL having a value function reducing the difference between an actual shape of the state trajectory and a shape of state trajectory estimated using ODE with the updated closure model.

However, after convergence, the ODE with updated CL represents the pattern of the dynamics of the behavior of the system but not the actual values of the behavior. In other words, the ODE with updated CL is a function proportional to actual physical dynamics of the system. To that end, some embodiments include a gain in the closure model that is later learned during online control of the system with methods more suitable to model based optimization than RL. Examples of these methods are extremum seeking, Gaussian processes-based optimization, etc.

Additionally, or alternatively, some embodiments use a model of the system determined by the data-driven adaptation in various model based predictive controls, e.g., MPC.

These embodiments allow to take advantage from ability of the MPC to consider constraints in control of the system. For example, classic RL methods are not suitable for data-driven control of constrained systems. This is because the classic RL methods do not consider state and input constraint satisfaction in continuous state-action spaces; that is, the classic RL cannot guarantee that the states of the controlled system operated with control inputs satisfy state and input constraints throughout the operation.

However, some embodiments use RL to learn the physics of the system allowing to combine the data-driven advantages of RL with model based constrained optimization.

Accordingly, one embodiment discloses an apparatus for controlling an operation of the system. The apparatus comprises an input interface configured to receive a state trajectory of the system; a memory configured to store a model of dynamics of the system including a combination of at least one differential equation and a closure model; a processor configured to: update the closure model using reinforcement learning (RL) having a value function reducing a difference between a shape of the received state trajectory and a shape of state trajectory estimated using the model with the updated closure model; and determine a control command based on the model with the updated closure model; and an output interface configured to transmit the control command to an actuator of the system to control the operation of the system.

Another embodiment discloses a method for controlling an operation of the system. The method uses a processor coupled to memory storing a model of dynamics of the system including a combination of at least one differential equation and a closure model, the processor is coupled with stored instructions when executed by the processor carry out steps of the method, comprising: receiving a state trajectory of the system; updating the closure model using reinforcement learning (RL) having a value function reducing a difference between a shape of the received state trajectory and a shape of state trajectory estimated using the model with the updated closure model; determining a control command based on the model with the updated closure model; and transmitting the control command to an actuator of the system to control the operation of the system.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4 shows a schematic architecture to generate a reduced order model, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
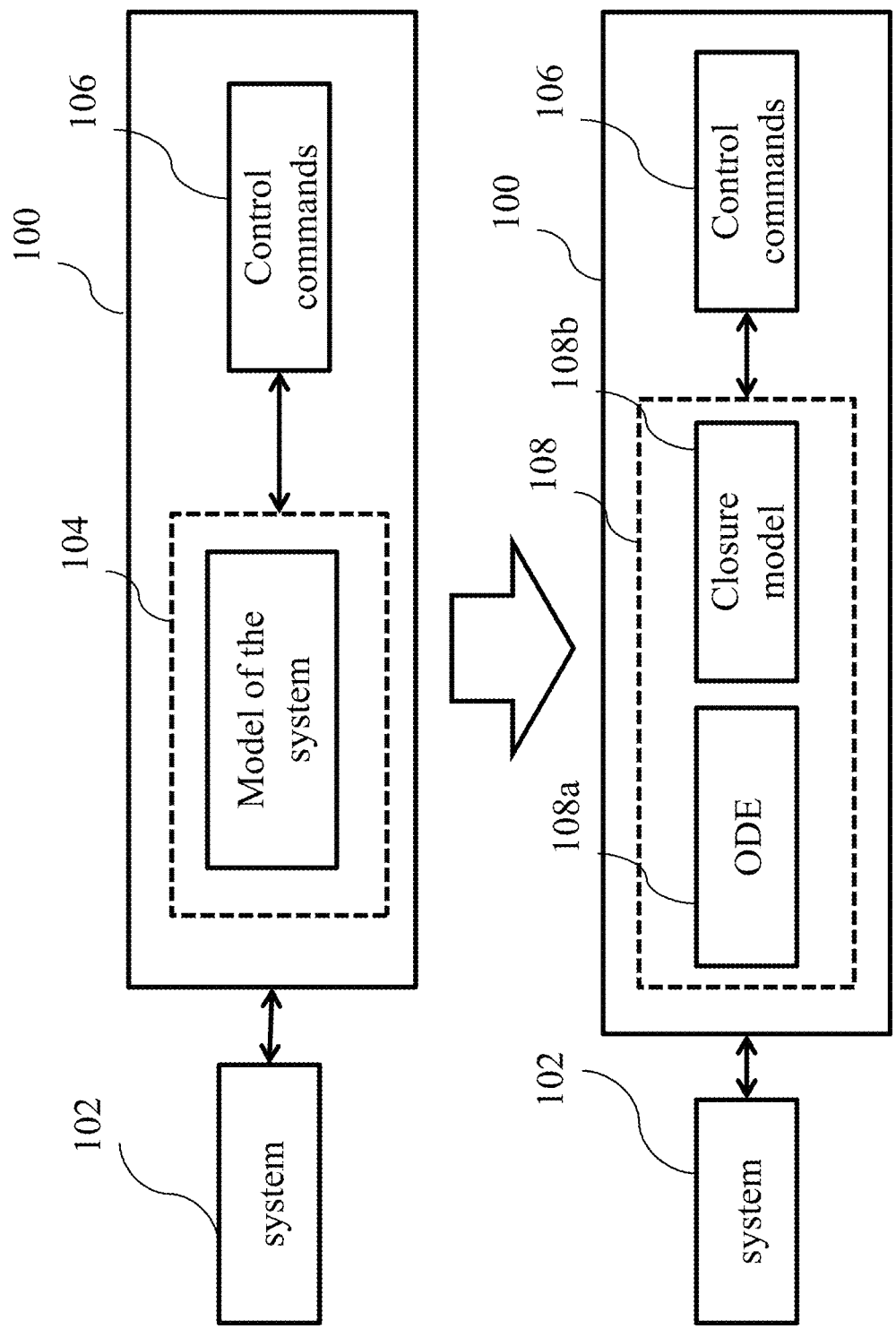
FIG. 1 shows a schematic overview of principles used by some embodiments for controlling an operation of a system.

FIG. 1 shows a schematic overview of principles used by some embodiments for controlling an operation of a system. Some embodiments provide a control apparatus 100 configured to control a system 102. For example, the apparatus 100 can be configured to control continuously operating dynamical system 102 in engineered processes and machines. Hereinafter, 'control apparatus' and 'apparatus' may be used interchangeable and would mean the same. Hereinafter, 'continuously operating dynamical system' and 'system' may be used interchangeably and would mean the same. Examples of the system 102 are HVAC systems, LIDAR systems, condensing units, production lines, self-tuning machines, smart grids, car engines, robots, numerically controlled machining, motors, satellites, power generators, traffic networks, and the like. Some embodiments are based on realization that the apparatus 100 develops control policies 106 for controlling the system 102 using control actions in an optimum manner without delay or overshoot and ensuring control stability.

In some embodiments, the apparatus 100 uses model-based and/or optimization-based control and estimation techniques, such as model predictive control (MPC), to develop the control commands 106 for the system 102. The model-based techniques can be advantageous for control of dynamic systems. For example, the MPC allows a model-based design framework in which the system 102 dynamics and constraints can directly be taken into account. The MPC develops the control commands 106, based on the model of the system 104. The model 104 of the system 102 refers to dynamics of the system 102 described using differential equations. In some embodiments, the model 104 is non-linear and can be difficult to design and/or difficult to use in real-time. For instance, even if the nonlinear model is exactly available, estimating the optimal control commands 106 are essentially a challenging task since a partial differential equation (PDE) describing the dynamics of the system 102, named Hamilton-Jacobi-Bellman (HJB) equation needs to be solved, which is computationally challenging.

Some embodiments use data-driven control techniques to design the model 104. The data-driven techniques exploit operational data generated by the system 102 in order to construct feedback control policy that stabilizes the system 102. For instance, each state of the system 102 measured during the operation of the system 102 may be given as the feedback to control the system 102. In general, the use of operational data to design the control policies and/or commands 106 is called data-driven control. The objective of data-driven control is to design a control policy from data and to use the data-driven control policy to control a system. In contrast with such data-driven control approaches, some embodiments use operational data to design a model, e.g., a model 104, of the control system and, then, to use the data-driven model to control the system using various model-based control methods. It should be noted, that the objective of some embodiments is to determined actual model of the system from data, i.e., such a model that can be used to estimate behavior of the system. For example, it is an object of some embodiments to determine the model of a system from data that capture dynamics of the system using differential equations. Additionally, or alternatively, it is an object of some embodiments to learn from data the model having physics-based PDE model accuracy.

To simplify the computation, some embodiments formulate an ordinary differential equation (ODE) 108a to describe the dynamics of the system 102. In some embodiments, the ODE 108a may be formulated using model reduction techniques. For example, the ODE 108a may be reduced dimensions of the PDE. To that end, the ODE 108a can be a part of the PDE. However, in some embodiments, the ODE 108a fails to reproduce actual dynamics (i.e. the dynamics described by the PDE) of the system 102, in cases of uncertainty conditions. Examples of the uncertainty conditions may be the case where boundary conditions of the PDE are changing over a time or the case where one of coefficients involved in the PDE are changing.

To that end, some embodiments formulate a closure model 108b that reduces the PDE, while covering the cases of the uncertainty conditions. In some embodiments, the closure model 108b may be a nonlinear function of a state of the system 102 capturing a difference in behavior (for instance, the dynamics) of the system 102 according to the ODE and the PDE. The closure model 108b may be formulated using reinforcement learning (RL). In other words, the PDE model of the system 102 is approximated by a combination of ODE 108a and a closure model 108b, and the closure model 108b is learned from data using RL. In such a manner, the model approaching the accuracy of PDE is learned from data.

In some embodiments, the RL learns a state trajectory of the system 102 that defines the behavior of the system 102, rather than learning individual states of the system 102. The state trajectory may be a sequence of states of the system 102. Some embodiments are based on realization that a model 108 comprising the ODE 108a and the closure model 108b reproduces a pattern of the behavior of the system 102, rather the actual behavior values (for instance, the states) of the system 102. The pattern of the behavior of the system 102 may represent a shape of the state trajectory, for instance, a series of states of the system as a function of time. The pattern of the behavior of the system 102 may also represent a high-level characteristic of the model, for example boundedness of its solutions over time, or decay of its solutions over time, however, it does not optimally reproduce the dynamics of the system.

To that end, some embodiments determine a gain and include the gain in the closure model 108b to optimally reproduce the dynamics of the system 102. In some embodiments, the gain may be updated using optimization algorithms. The model 108 comprising the ODE 108a, the closure model 108b with the updated gain reproduces the dynamics of the system 102. Therefore, the model 108 optimally reproduces the dynamics of the system 102. Some embodiments are based on realization the model 108 comprises less number of parameters then the PDE. To that end, the model 108 is computationally less complex then the PDE that describes the physical model of the system 102. In some embodiments, the control polices 106 are determined using the model 108. The control policies 106 directly map the states of the system 102 to control commands to control the operations of the system 102. Therefore, the reduced model 108 is used to design control for the system 102 in efficient manner.

Figure 2:
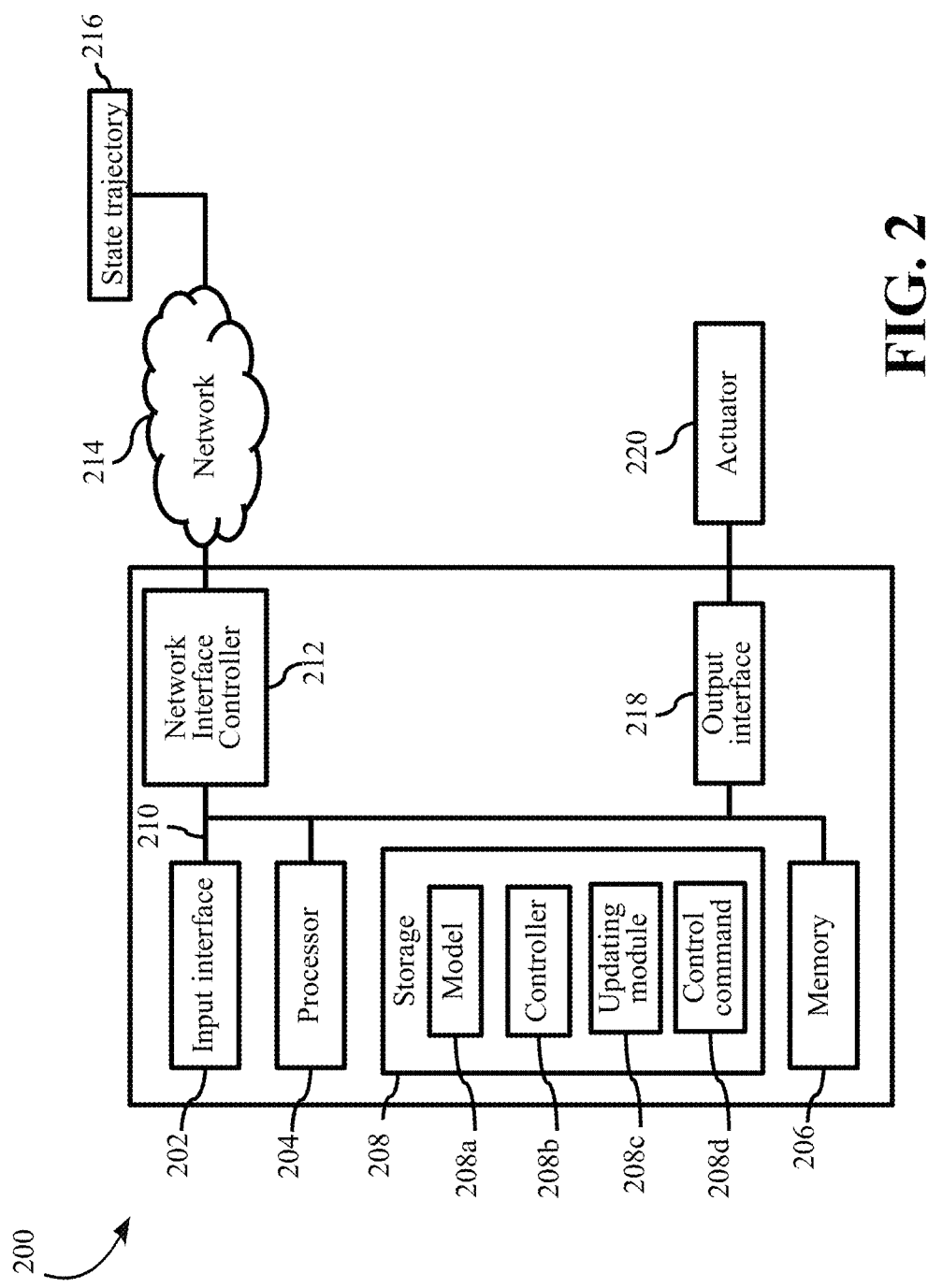
FIG. 2 shows a block diagram of an apparatus for controlling the operation of the system, according to some embodiments.

FIG. 2 shows a block diagram of an apparatus 200 for controlling an operation of the system 102, according to some embodiments. The apparatus 200 includes an input interface 202 and an output interface 218 for connecting the apparatus 200 with other systems and devices. In some embodiments, the apparatus 200 may include a plurality of input interfaces and a plurality of output interfaces. The input interface 202 is configured to receive a state trajectory 216 of the system 102. The input interface 202 includes a network interface controller (NIC) 212 adapted to connect the apparatus 200 through a bus 210 to a network 214. Through the network 214, either wirelessly or through wires, the apparatus 200 receives the state trajectory 216 of the system 102.

The state trajectory 216 may be a plurality of states of the system 102 that defines an actual behavior of dynamics of the system 102. For instance, the state trajectory 216 acts as a reference continuous state space for controlling the system 102. In some embodiments, the state trajectory 216 may be received from real-time measurements of parts of the system 102 states. In some other embodiments, the state trajectory 216 may be simulated using the PDE that describes the dynamics of the system 102. In some embodiments, a shape may be determined for the received state trajectory as a function of time. The shape of the state trajectory may represent an actual pattern of behavior of the system 102.

The apparatus 200 further includes a processor 204 and a memory 206 that stores instructions that are executable by the processor 204. The processor 204 may be a single core processor, a multi-core processor, a computing cluster, or any number of other configurations. The memory 206 may include random access memory (RAM), read only memory (ROM), flash memory, or any other suitable memory system. The processor 204 is connected through the bus 210 to one or more input and output devices. The stored instructions implement a method for controlling the operations of the system 102.

The memory 206 may be further extended to include storage 208. The storage 208 may be configured to store a model 208a, a controller 208b, an updating module 208c, and a control command module 208d. In some embodiments, the model 208a may be the model describing the dynamics of the system 102, which includes a combination of at least one differential equation and a closure model. The differential equation of the model 208 may be the ordinary differential equation (ODE) 108a. The closure model of model 208a may be a linear function or a nonlinear function of the state of the system 102. The closure model may be learnt using the RL to mimic the behavior of the system 102. As should be understood, once the closure model is learnt the closure model may be the closure 108b as illustrated in FIG. 1.

The controller 208b may be configured to store instructions upon execution by the processor 204 executes one or more modules in the storage 208. Some embodiments are based on realization that the controller 208b administrates each module of the storage 208 to control the system 102.

The updating module 208c may be configured to update the closure model of the model 208a using the reinforcement learning (RL) having a value function reducing a difference between the shape of the received state trajectory and a shape of state trajectory estimated using the model 208a with the updated closure model. In some embodiments, the updating module 208c may be configured to update the closure module iteratively with the RL until a termination condition is met. The updated closure model is the nonlinear function of the state of the system capturing a difference in behavior of the system according to the ODE and the PDE.

Further, in some embodiments, the updating module 208c may be configured to update a gain for the updated closure model. To that end, some embodiments determines the gain reducing an error between the state of the system 102 estimated with the model 208a having the updated closure model with the updated gain and an actual state of the system. In some embodiments, the actual state of the system may be a measured state. In some other embodiments, the actual state of the system may be a state estimated with the PDE describing the dynamics of the system 102. In some embodiments, the updating module 208c may update the gain using an extremum seeking. In some other embodiments, the updating module 208c may update the gain using a Gaussian process-based optimization.

The control command module 208c may be configured to determine a control command based on the model 208a with the updated closure model. The control command may control the operation of the system. In some embodiments, the operation of the system may be subject to constraints. To that end, the control command module 208c uses a predictive model based control to determine the control command while enforcing constraints. The constraints include state constraints in continuous state space of the system 102 and control input constraints in continuous control input space of the system 102.

The output interface 218 is configured to transmit the control command to an actuator 220 of the system 102 to control the operation of the system. Some examples of the output interface 218 may include a control interface that submits the control command to control the system 102.

Figure 3:
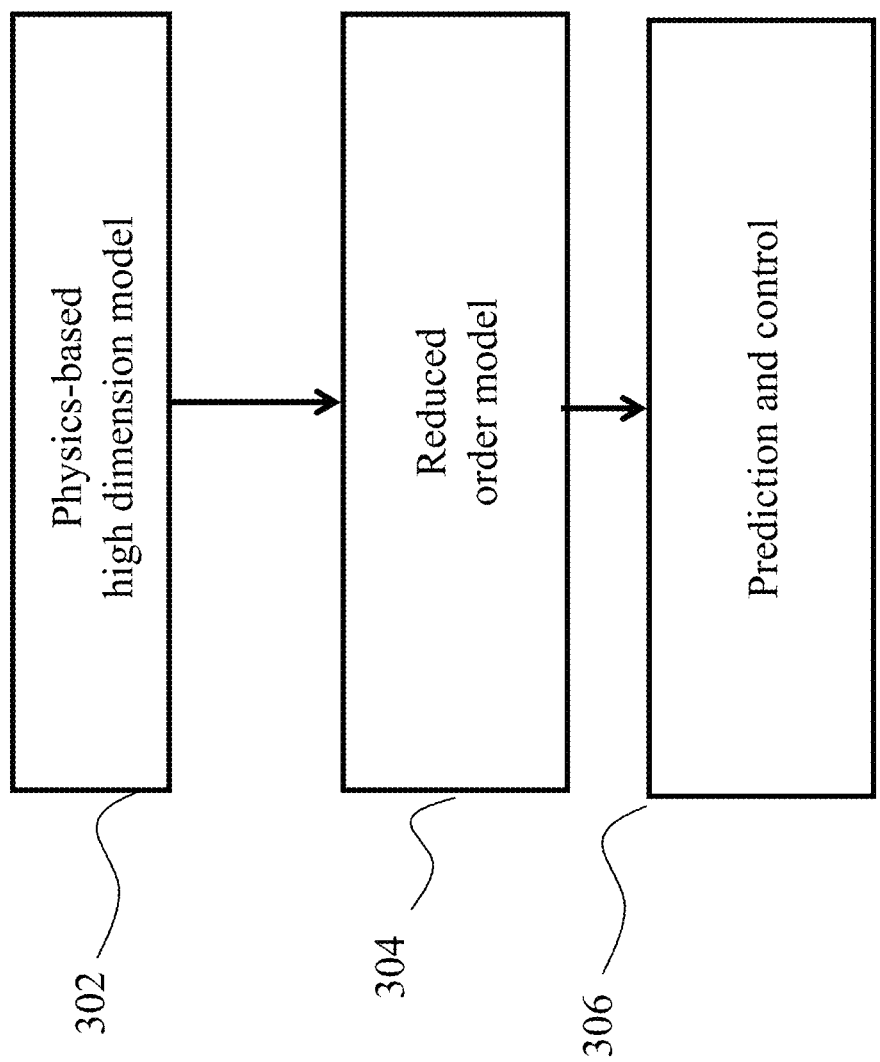
FIG. 3 shows a flowchart of principles for controlling the system, according to some embodiments.

FIG. 3 shows a flowchart of principles for controlling the system 102, according to some embodiments. Some embodiments are based on realization that the system 102 can be modeled from physics laws. For instance, the dynamics of the system 102 can be represented by mathematical equations using the physics laws. At step 302, the system 102 may be represented by a physics-based high dimension model. The physics-based high dimension model may be the partial differential equation (PDE) describing the dynamics of the system 102. For the sake of explanation, the system 102 is considered to be the HVAC system, whose model is represented by Boussinesq equation. The Boussinesq equation is obtained from the physics, which describes a coupling between airflow and a temperature in a room. Accordingly, the HAVC system model can be mathematically represented as:

$$\vec{u}_t = \mu \Delta \vec{u} - (\vec{u} \cdot \nabla) \vec{u} - \nabla p - T$$

$$\nabla \cdot \vec{u} = 0$$

$$T_t = k \Delta T - u \cdot \nabla T$$

where T is a temperature scalar variable, $\vec{u}$ is a velocity vector in three dimensions, μ is a viscosity and the reciprocal of the Reynolds number, k is a heat diffusion coefficient, and p is a pressure scalar variable.

The operator Δ and ∇ are defined as:

$$\Delta = \nabla^2$$

$$\nabla = \left(\frac{\delta}{\delta x}, \frac{\delta}{\delta y}, \frac{\delta}{\delta z}\right) T$$

Some embodiments are based on realization that the physics-based high dimension model of the system 102 needs to be resolved to control the operations of the system 102 in real-time. For instance, in the case of the HVAC system, the Boussinesq equation needs to be resolved to control the airflow dynamics and the temperature in the room. Some embodiments are based on recognition that the physics-based high dimension model of the system 102 comprises a large number of equations and variables, which are complicated to resolve. For instance, a larger computation power is required to resolve the physics-based high dimension model in real-time. To that end, it is objective of some embodiments to simplify the physics-based high dimension model.

At step 304, the apparatus 200 is provided to generate a reduced order model to reproduce the dynamics of the system 102 such that the apparatus 200 controls the system 102 in efficient manner. In some embodiments, the apparatus 200 may simplify the physics-based high dimension model using model reduction techniques to generate the reduced order model. Some embodiments are based on realization that the model reduction techniques reduce the dimensionality of the physics-based high dimension model (for instance, the variables of the PDE), such that the reduced order model may be used to in real-time for prediction and control of the system 102. Further, the generation of reduced order model for controlling the system 102 is explained in detail with reference to FIG. 4. At step 306, the apparatus 200 uses the reduced order model in real-time to predict and control the system 102.

FIG. 4 shows a schematic architecture to generate the reduced order model, according to some embodiments. Some embodiments are based on realization that the apparatus 200 use the model reduction techniques to generate a reduced order model (ROM) 406. The generated ROM 406, using the model reduction techniques, may be a part of the physics-based high dimension model 402. The part of the physics-based high dimension model 402 may be one or more differential equations describing the dynamics of the system 102. The part of the physics-based high dimension model 402 may be the ordinary differential equation (ODE). In some embodiments, the ODE fails to reproduce the actual dynamics (i.e. the dynamics described by the PDE), in the case of uncertainty conditions. Examples of the uncertainty conditions may be the case where the boundary conditions of the PDE are changing over the time or the case where one of the coefficients involved in the PDE are changing. These mathematical changes actually reflect some real changes in the actual dynamics. For example, in case of the HVAC system, an opening or closing of a window and/or a door in a room changes the boundary conditions of the Boussinesq equation (i.e. the PDE). Similarly, weather changes, such as daily and seasonal changes, affect the difference between a temperature in the room and outside of the room, which in turn affects some of the PDE coefficients, e.g. Reynold's number can be affected.

In all these scenarios, the model reduction techniques fail to have a unified approach to obtain the reduced order (or reduced dimension) model 406 of the dynamics of the system 102 covering all the above scenarios, i.e., parametric uncertainties as well as boundaries conditions uncertainties.

It is objective of some embodiments to generate the ROM 406 that reduces the PDE in the cases of changing boundary conditions and/or changing parameters. To that end, some embodiments use adaptive model reduction method, regimes detection method and the like.

For instance, in one embodiment of the invention the reduced order 406 has the quadratic form:

$$\dot{x}_r = b + A x_r + x_r^T B x_r$$

where b, A, B are constants related to the constants of the PDE equation and to the type of model reduction algorithm used, and $x_r$ is of a reduced dimension r and represents the vector of the reduced order states. The original states of the system x can be recovered from $x_r$ using the following simple algebraic equation $$x(t) \approx \Phi x_r(t)$$

where x is usually a vector of high dimension n≫r, containing the n states obtained from the spatial discretization of the PDE equation, and Φ is a matrix formed by concatenating given vectors called modes or basis vectors of the ROM 406. These modes differ depending on which model reduction method is used. Examples of the model reduction methods include a proper orthogonal decomposition (POD), dynamic mode decomposition (DMD) method, and the like.

However, the solution of the ROM equation 406 can lead to unstable solution (divergent over a finite time support) which is not reproducing the physics of the original PDE models having a viscous term that makes the solutions always stable, i.e. bounded over a bounded time support. For instance, the ODE may lose intrinsic characteristics of actual solutions of the physics-based high dimension model, during the model reduction. To that end, the ODE may lose boundedness of the actual solutions of the physics-based high dimension model in space and time.

Accordingly, some embodiments modify the ROM 406 by adding a closure model 404 representing a difference between the ODE and the PDE. For instance, the closure model 404 captures the lost intrinsic characteristics of the actual solutions of the PDE and acts like a stabilizing factor. Some embodiments allow updating only the closure model 406 to reduce the difference between the ODE and PDE.

For instance, in some embodiments, the ROM 406 can be mathematically represented as:

$$\dot{x}_r = b + Ax_r + x_r^T Bx_r + F(K,x)$$

The function F is the closure model 404, which is added to stabilize the solutions of the ROM model 406. The terms $b + Ax_r + x_r^T Bx_r$ represent the ODE. The term K represents a vector of coefficients that should be tuned to ensure the stability, as well as, the fact that the ROM 406 needs to reproduce the dynamics or solutions of the original PDE model. In some embodiments, the closure model 404 is the linear function of the state of the system 102. In some other embodiments, the closure model 404 may be the nonlinear function of the state of the system 102. In some embodiments, the reinforcement learning (RL)-based data-driven method may be used to compute the closure model 404. Further, the computation of the closure model 404 using the reinforcement learning (RL) is explained in detail with reference to FIGS. 5A-5B.

Figure 5A:
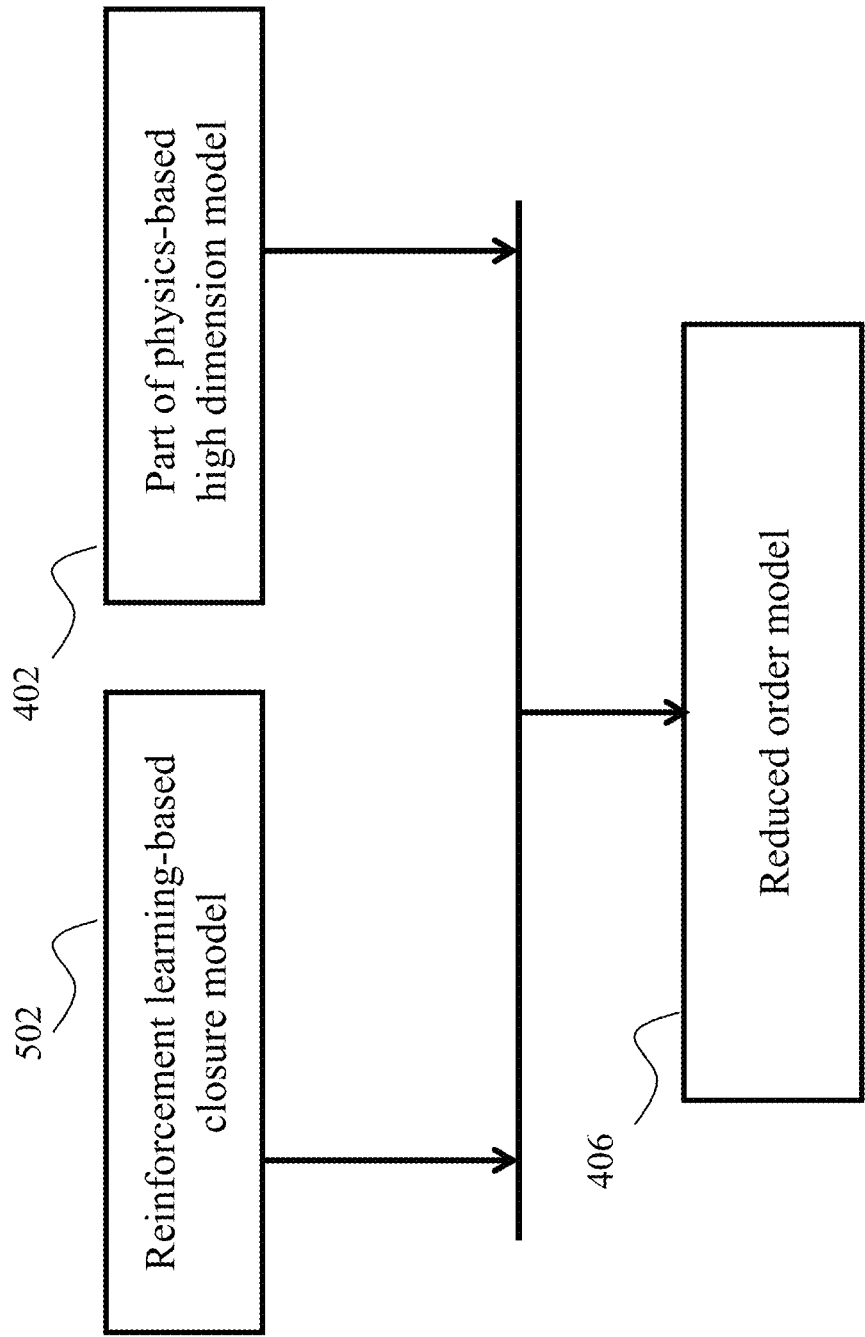
FIG. 5A shows a schematic of the reduced order model based on reinforcement learning (RL), according to some embodiments.

FIG. 5A shows a schematic of the reduced order model 406 based on reinforcement learning (RL), according to some embodiments. In some embodiments, the RL-based data-driven method may be used to compute a RL-based closure model 502. Some embodiments are based on recognition that the closure model 402 is iteratively updated with the RL to compute the RL-based closure model 502. The RL-based closure model 502 may be an optimal closure model. Further, the iterative process for updating the closure model 404 is explained in detail with reference to FIG. 5B. Some embodiments are based on realization that the optimum closure model in combination with ODE may form the optimal ROM 406. In some embodiments, the ROM 406 may estimate the actual pattern of behavior the system 102. For instance, the ROM 406 mimics the shape of the received state trajectory.

Figure 5B:
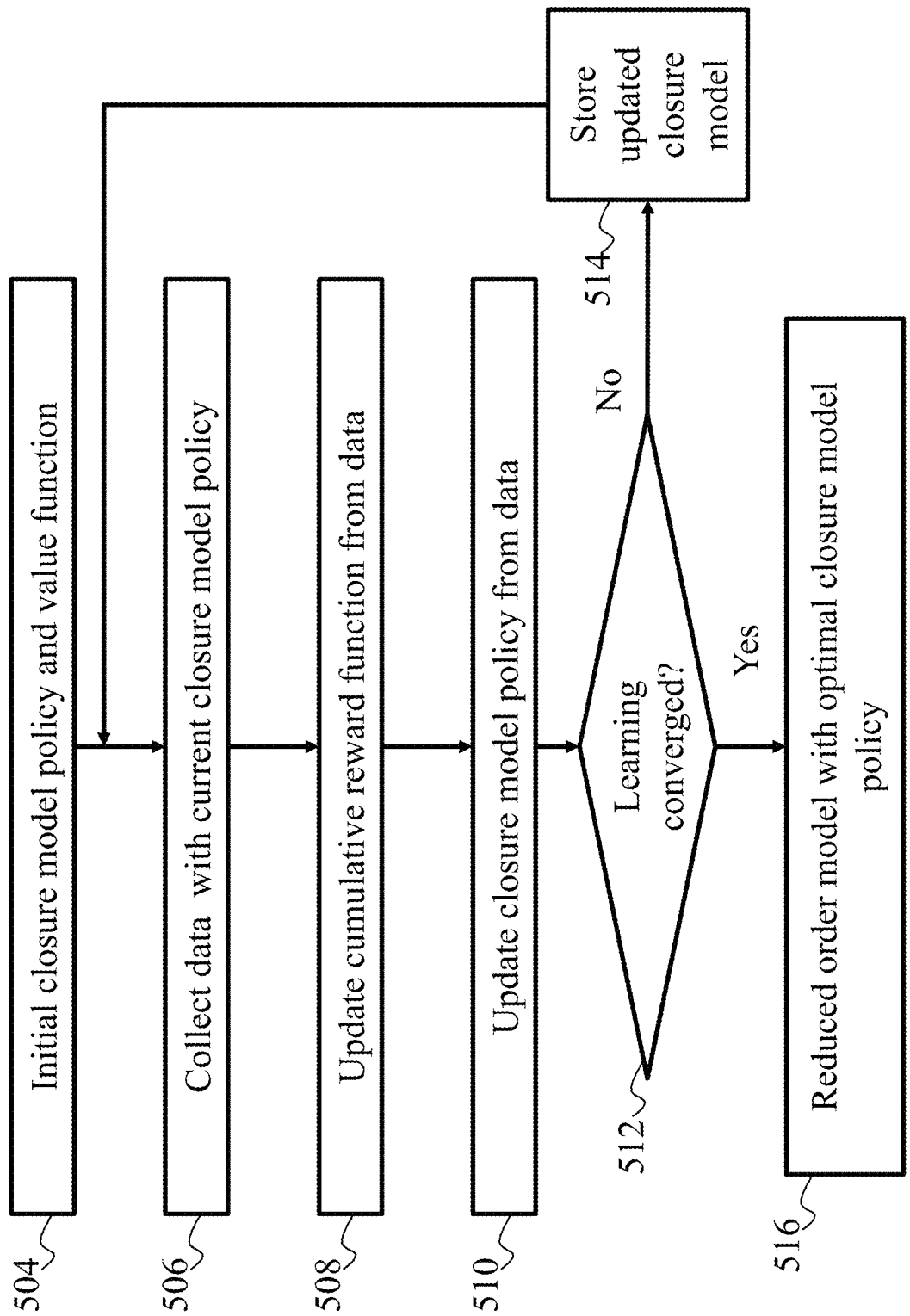
FIG. 5B shows a flowchart of operations for updating a closure model using the RL, according to an embodiment of the invention.

FIG. 5B shows a flowchart of operations for updating the closure model 502 using the RL, according to an embodiment of the invention. At step 504, the apparatus 200 may be configured to initialize an initial closure model policy and a learning cumulative reward function associated with the initial closure model policy. The initial closure model policy may be a simple linear closure model policy. The cumulative reward function may be a value function. At step 506, the apparatus 200 is configured to run the ROM 406 comprising the part of the physics-based high dimension model 402 and the current closure model (for instance, the initial closure model policy) to collect data along a finite time interval. To that end, the apparatus 200 collects the data representing the pattern of behavior of the dynamics of the system 102. For instance, the pattern of the behavior captures rate of change of the energy of the system 102 over the finite time interval. Some embodiments are based on realization that the pattern of behavior of the dynamics of the system 102 can be represented by the shape of the state trajectory over the finite time interval.

At steps 508, the apparatus 200 is configured to update the cumulative reward function using the collected data. In some embodiments, the apparatus 200 updates the cumulative reward function (i.e. the value function) to indicate the difference between the shape of the received state trajectory and the shape of state trajectory estimated using the ROM 406 with the current closure model (for instance, the initialized closure model).

Some embodiments are based on realization that the RL uses a neural network trained to minimize the value function. To that end, at step 510, the apparatus 200 is configured to update the current closure model policy using the collected data and/or the updated cumulative reward function, such that the value function is minimized.

In some embodiments, the apparatus 200 is configured to repeat the steps 506, 508, and 510 until a termination condition is met. To that end, at step 512, the apparatus 200 is configured to determine whether the learning is converged. For instance, the apparatus 200 determines whether the learning cumulative reward function is below a threshold limit or whether the two consecutive learning cumulative reward functions are within a small threshold limit. If the learning is converged, the apparatus 200 proceeds with step 516, else the apparatus 200 proceeds with step 514. At step 514, the apparatus 200 is configured to replace the closure model with the updated closure model and iterates the updating procedure until the termination condition is met. In some embodiments, the apparatus 200 iterates the updating procedure until the learning is converged. At step 514, the apparatus 200 is configured to stop the closure model learning and use the last updated closure model policy as the optimal closure model for the ROM 406.

For instance, given a closure model policy u(x), some embodiments define an infinite horizon cumulative reward functional given an initial state $x_0 \in \mathbb{R}^{n_x}$ as $$\mathcal{J}(x_0, u) := \sum_{t=0}^{\infty} \gamma^t \mathcal{U}(x_t, u(x_t)),$$

where $\mathcal{U}$ is a positive definite value function with $\mathcal{U}(0,0)=0$ and $\{x_k\}$ denotes the sequence of states generated by the closed loop system:

$$x_{t+1} = Ax_t + Bu(x_t) + G\phi(C_q x_t)$$

In some embodiments, the scalar $\gamma \in (0,1]$ is a forgetting/discount factor intended to enable the cost to be emphasized more by current state and control actions and lend less credence to the past.

A continuous control policy $u(\cdot): \mathbb{R}^{n_x} \to \mathbb{R}^{n_u}$ is an admissible control policy on $X \subset \mathbb{R}^{n_x}$ if it stabilizes the closed loop system on X and $\mathcal{J}(x_0, u)$ is finite for any initial state $x_0$ in X. An optimal control policy may be designed that achieves the optimal cumulative reward $$\mathcal{J}_\infty(x_0) = \inf_{u \in \mathcal{U}_0} \mathcal{J}(x_0, u)$$

for any initial state $x_0$ in X. Here, $\mathcal{U}_0$ denotes the set of all admissible control policies. In other words, an optimal control policy may be computed as:

$$u_\infty = \arg \inf_{u \in \mathcal{U}_0} \mathcal{J}(x_0, u).$$

Directly constructing such an optimal controller is very challenging for general nonlinear systems; this is further exacerbated because the system contains uncertain dynamics. Therefore, some embodiments use adaptive/approximate dynamic programming (ADP): a class of iterative, data-driven algorithms that generate a convergent sequence of control policies whose limit is mathematically proven to be the optimal control policy $u_\infty(x)$.

From the Bellman optimality principle, the discrete-time Hamilton-Jacobi-Bellman equations are given by $$J_\infty(x_t) = \inf_{u \in \mathcal{U}_0} \mathcal{U}(x_t, u(x_t)) + \gamma J_\infty(x_{t+1})$$

$$u_\infty(x_t) = \arg \inf_{u \in \mathcal{U}_0} \mathcal{U}(x_t, u(x_t)) + \gamma J_\infty(x_{t+1})$$

ADP methods typically involve performing iterations over cumulative reward functions and closure model policies in order to ultimately converge to the optimal value function and optimal closure model policy. The key operations in ADP methods involve setting an admissible closure model policy $u_0(x)$ and then iterating the policy evaluation step until convergence.

$$J_{k+1}(x_t) = \inf_{u \in \mathcal{U}_0} \mathcal{U}(x_t, u(x_t)) + \gamma J_{k+1}(x_{t+1})$$

$$u_{k+1}(x_t) = \arg \min_u \mathcal{U}(x_t, u(x_t)) + \gamma J_{k+1}(x_{t+1})$$

For instance, according to some embodiments, $F = K_0 x$ is an admissible closure model policy and the learning cumulative reward function approximator is:

$$\mathcal{J}_k(x) = \omega_k^T \psi(x)$$

where $\psi(x)$ are a set of differentiable basis functions (equivalently, hidden layer neuron activations) and $\omega_k$ is the corresponding column vector of basis coefficients (equivalently, neural network weights). The initial weight vector is, therefore, $\omega_0$.

In one embodiment, when the goal of the ROM 406 is to generate solutions that minimize the quadratic value function:

$$\mathcal{U}(x_t, u_t) = x_t^T Q x_t + u_t^T R u_t,$$

where R, and Q are two user defined positive weight matrices.

Then the closure model policy improvement step is given by $$F_{k+1}(x) = -\frac{\gamma}{2} R^{-1} \nabla \psi(x)^\top \omega_{k+1}.$$

Some embodiments are based on recognition that the generated ROM 406 (for instance, an optimal ROM) comprising the ODE 402 and the optimal closure model mimics the pattern of the actual behavior of the system 102, but not the actual values of the behavior. In other words, the ODE 402 with the optimal closure model is a function proportional to the actual physical dynamics of the system 102. For instance, the behavior (i.e. an estimated behavior) of the optimal ROM 406 may be qualitatively similar to the actual behavior of the system 102, but there may exists a quantitative gap between the actual behavior of the system 102 and the estimated behavior. Further, a difference between the actual behavior and the estimated behavior is explained in detail with reference to FIG. 6.

Figure 6:
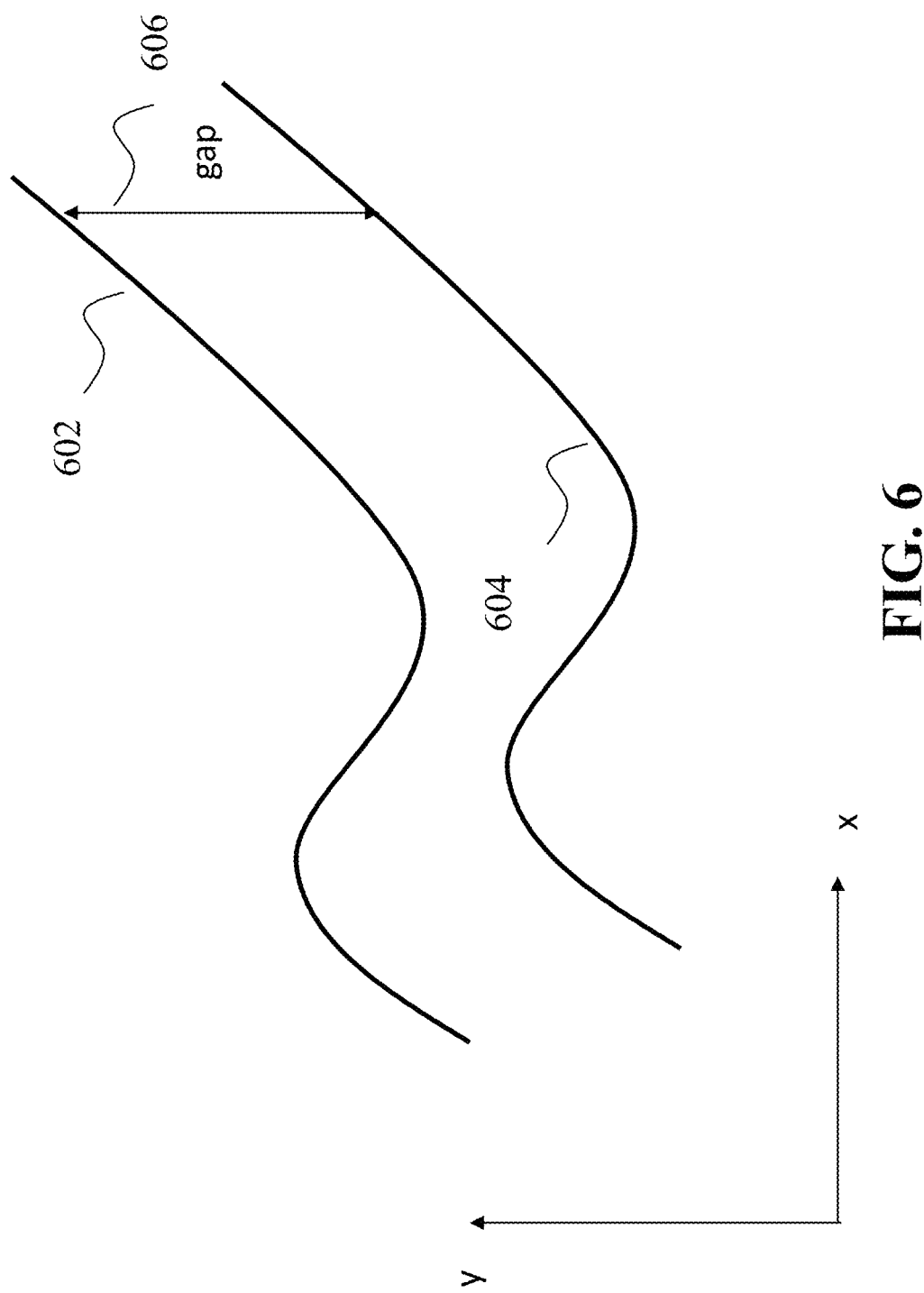
FIG. 6 shows a difference between an actual behavior and an estimated behavior of the system, according to some embodiments.

FIG. 6 shows the difference between the actual behavior and the estimated behavior of the system 102, according to some embodiments. In some embodiments, the pattern of the behavior of the system 102 may be represented by 2-dimensional axes, where x-axis corresponds to time and y-axis corresponds to magnitude of energy of the system 102. A wave 602 may represent the actual behavior of the system 102. A wave 604 may represent the estimated behavior of the system 102. Some embodiments are based on recognition that there may exist a quantitative gap 606 between the actual behavior 602 and the estimated behavior 604. For instance, the actual behavior 602 and the estimated behavior 604 may have similar frequencies, but has different amplitudes.

To that end, it is objective of some embodiments to include a gain in the optimal closure model, such that the gap 606 between the actual behavior 602 and the estimated behavior 604 is reduced. For instance, in some embodiments, the closure model may be represented as:

$$F_{k+1}(x) = -\frac{\theta \gamma}{2} R^{-1} \nabla \psi(x)^\top \omega_{k+1}.$$

where $\theta$ is a positive gain that needs to be optimally tuned to minimize a learning cost function Q, such that the gap 606 between the actual behavior 602 and the estimated behavior 604 is reduced. Further, the apparatus 200 to determine the gain for reducing the gap 606 is explained in detail with reference to FIG. 7.

Figure 7A:
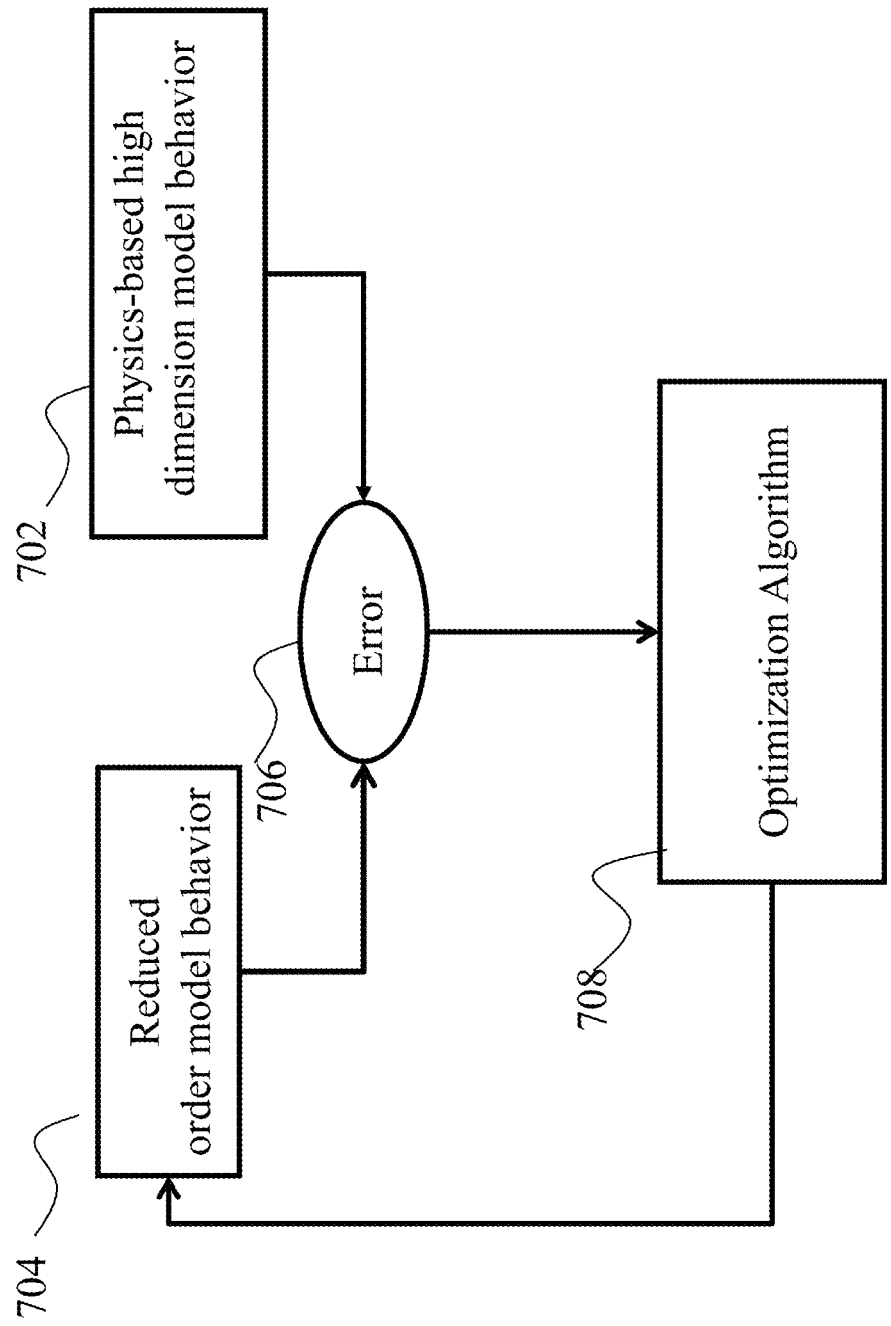
FIGS. 7A, 7B and 7C show a schematic of optimization algorithm for tuning an optimal closure model, according to an embodiment of the invention.
Figure 7B:
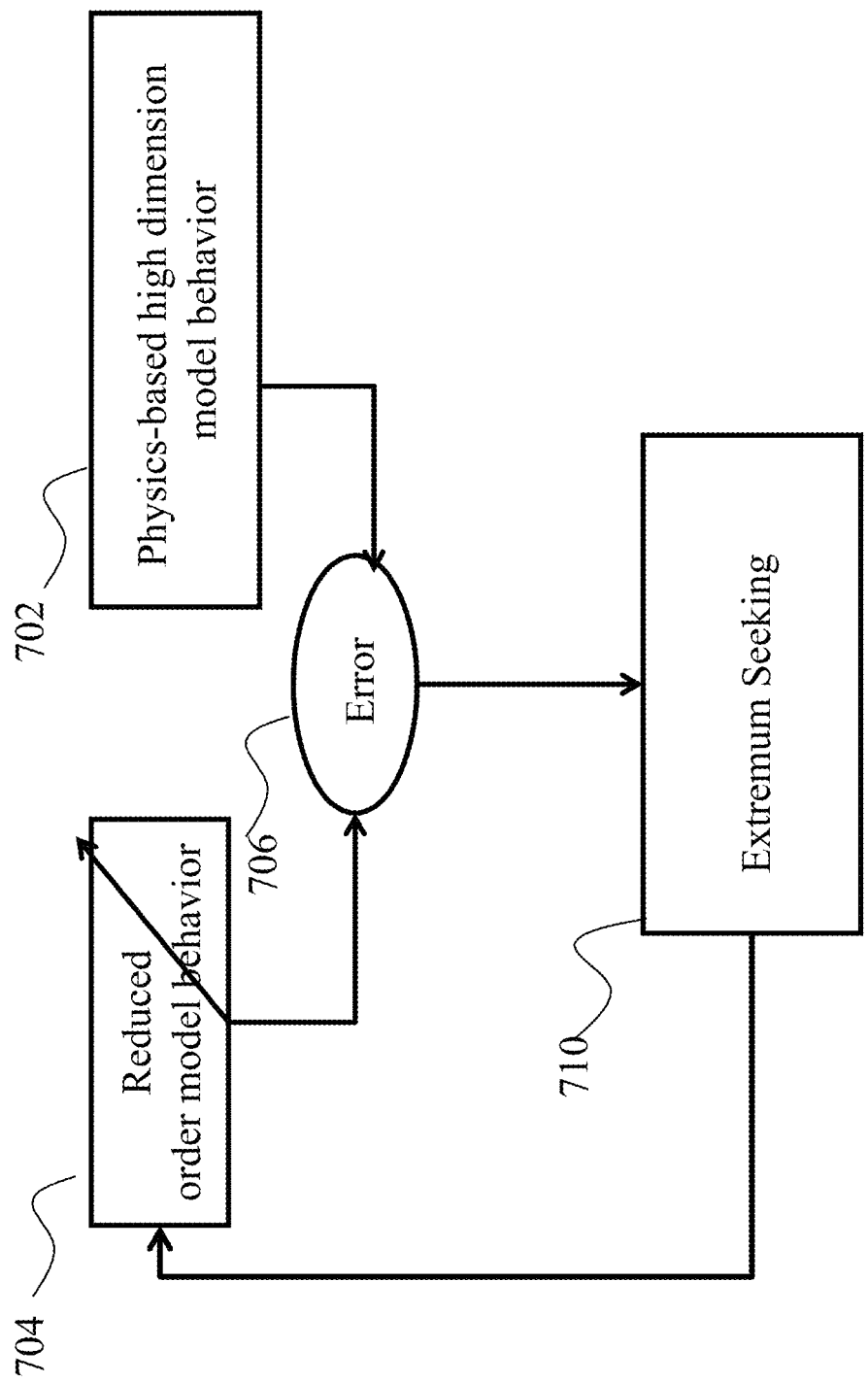
Figure 7C:
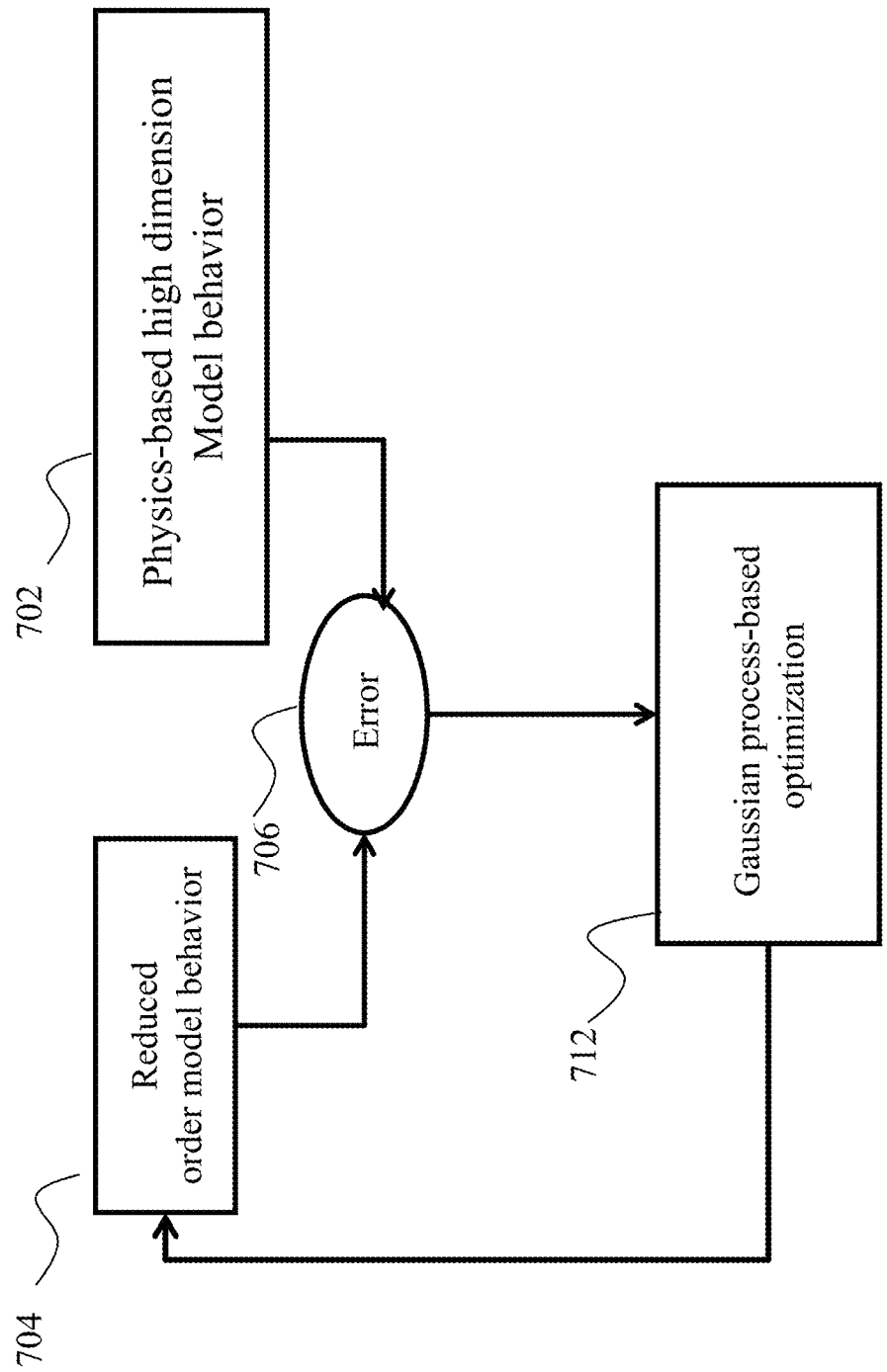

FIGS. 7A-7C show a schematic of optimization algorithm for tuning the optimal closure model, according to an embodiment of the invention. Some embodiments are based on recognition that the ROM 406 comprising the ODE 402 and the optimal closure model (i.e. the optimal ROM 406) may be useful for a small time-interval. In other words, the optimal ROM 406 forces the behavior of the system 102 to be bounded only for the small time-interval. To that end, it is objective of some embodiments to tune the gain (also referred to as coefficients) of the optimal ROM 406 over time.

In an embodiment, the apparatus 200 uses a physics-based high dimension model behavior 702 (i.e. the actual behavior 602) to tune the gain of the optimal closure model. In some example embodiments, the apparatus 200 computes an error 706 between an estimated behavior 704 corresponding to the optimal ROM 406 and the behavior 702. Further, the apparatus 200 determines the gain that reduces the error 706. Some embodiments are based on realization that the apparatus 200 determines the gain that reduces the error 706 between the state of the system 102 estimated with the optimal ROM 406 (i.e. the estimated behavior 704) and the actual state of the system 102 estimated with the PDE (i.e.

the behavior 702). In some embodiments, the apparatus 200 updates the determined gain in the optimal closure model to include the determined gain.

Some embodiments are based on realization that the apparatus 200 uses optimization algorithms to update the gain. In one embodiment, the optimization algorithm may be an extremum seeking (ES) 710, as exemplary illustrated in 7B. In another embodiment, the optimization algorithm may be a Gaussian process-based optimization 712, as exemplary illustrated in 7C.

Figure 8A:
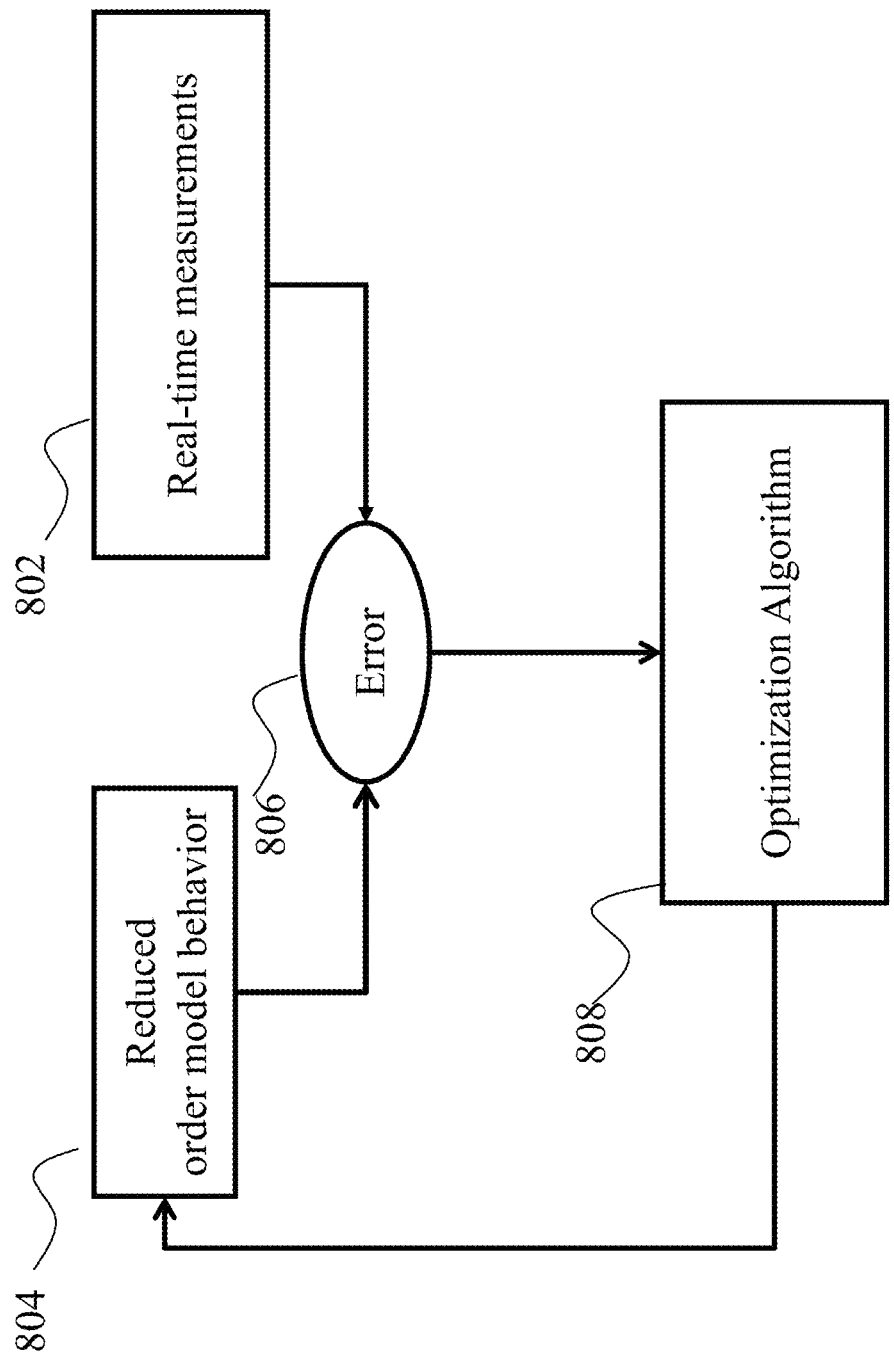
FIGS. 8A, 8B and 8C show a schematic of optimization algorithm for tuning the optimal closure model, according to another embodiment of the invention.
Figure 8B:
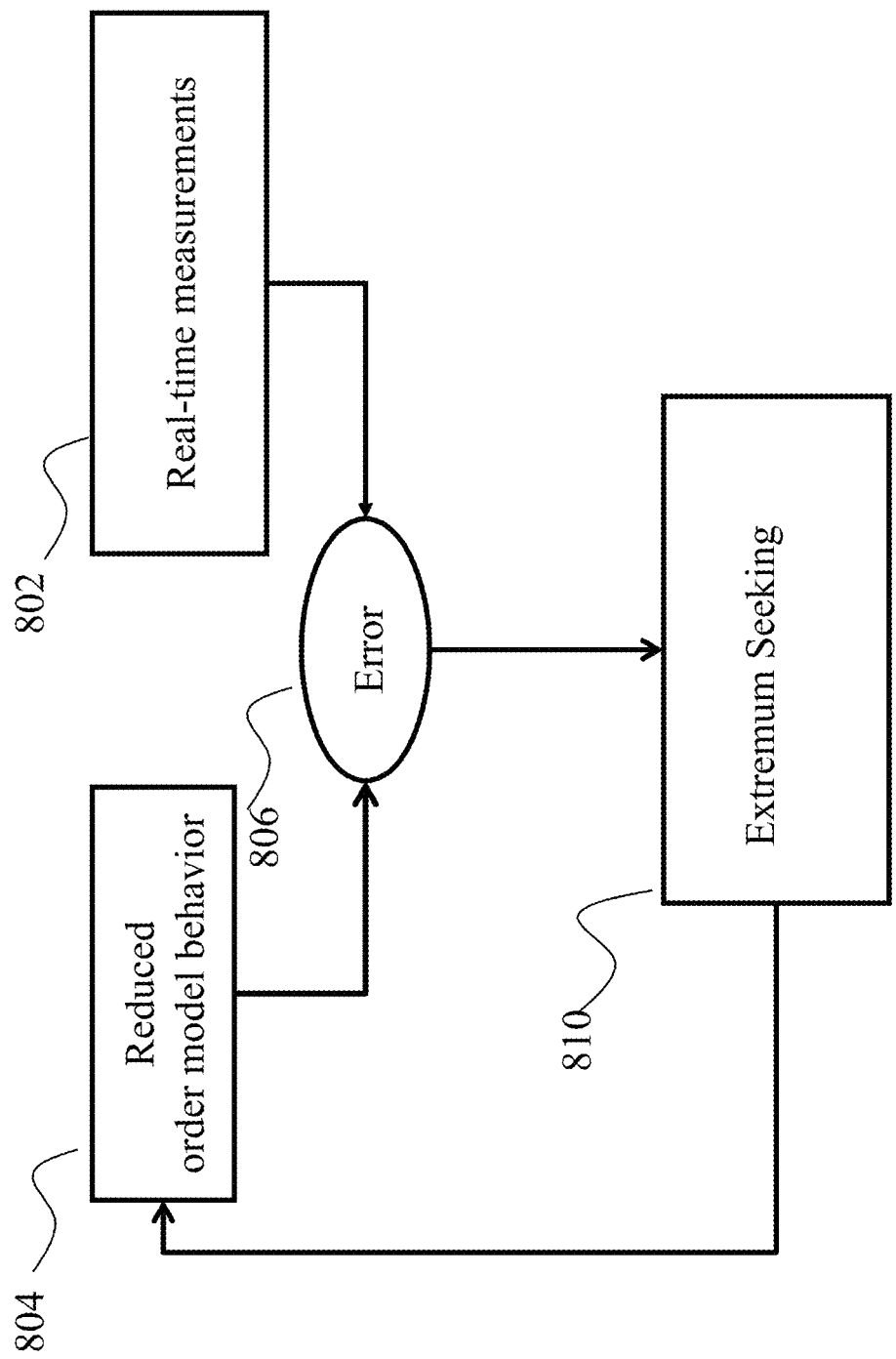
Figure 8C:
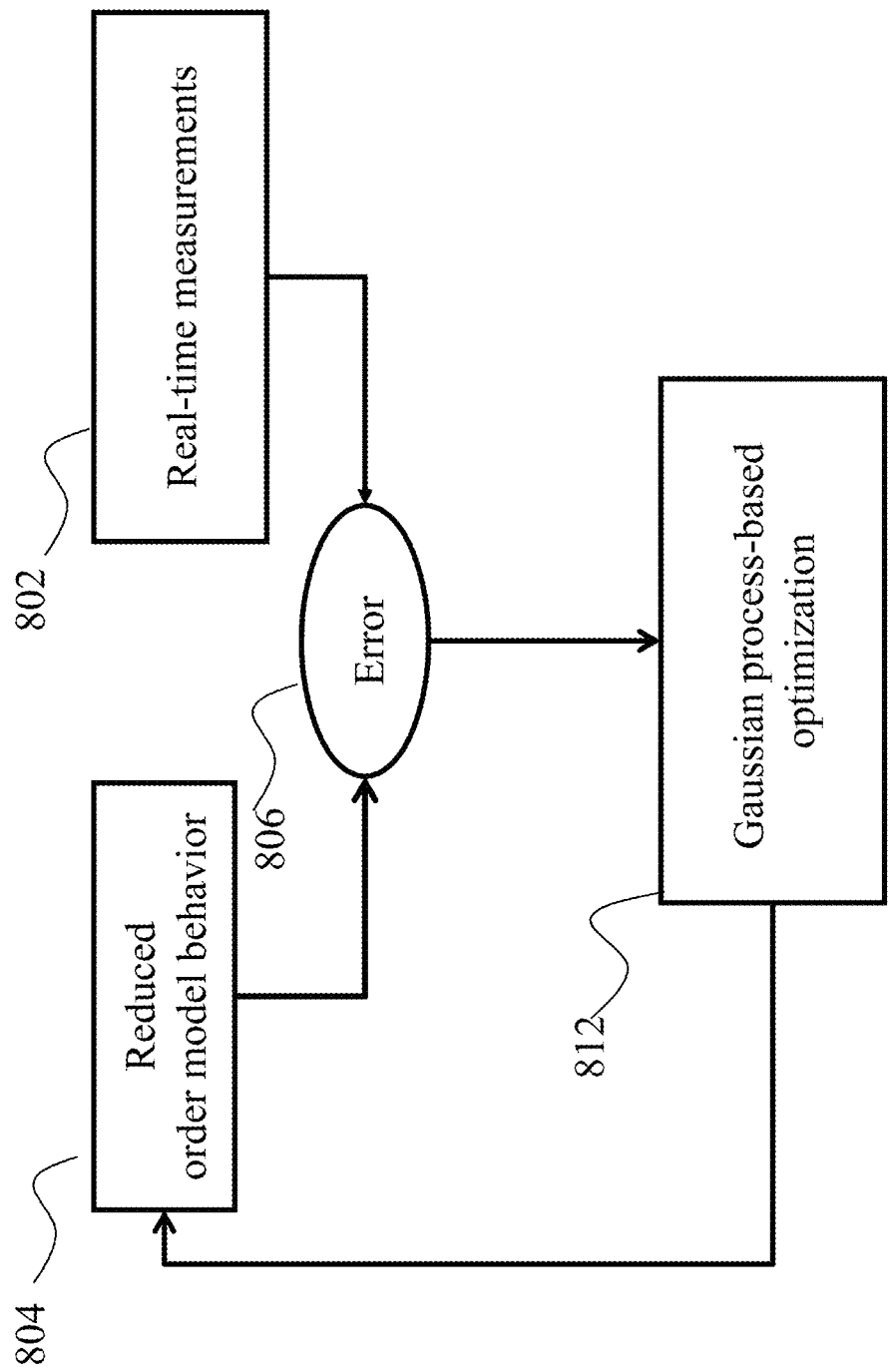

FIG. 8A-8C shows a schematic of optimization algorithm for tuning the optimal closure model, according to another embodiment of the invention. Some embodiments are based on recognition that the optimal ROM 406 may be useful for the small time-interval. In other words, the optimal ROM 406 forces the behavior of the system 102 to be bounded only for the small time-interval. To that end, it is objective of some embodiments to tune the gain of the optimal ROM 406 over time.

In an embodiment, the apparatus 200 uses real-time measurements of parts of the system 102 states 802 (i.e. the actual behavior 602) to tune the gain of the optimal closure model. In some example embodiments, the apparatus 200 computes an error 806 between an estimated behavior 804 corresponding to the optimal ROM 406 and the actual behavior 602 (for instance, the real-time measured states 802 of the system 102). Further, the apparatus 200 determines the gain that reduces the error 806. Some embodiments are based on realization that the apparatus 200 determines the gain that reduces the error 806 between the state of the system 102 estimated with the optimal ROM 406 (i.e. the estimated behavior 704) and the actual state of the system 102 (i.e. the real-time measured state 802). In some embodiments, the apparatus 200 updates the determined gain in the optimal closure model to include the determined gain.

Some embodiments are based on realization that the apparatus 200 uses optimization algorithms to update the gain. In one embodiment, the optimization algorithm may be an extremum seeking (ES) 810, as exemplary illustrated in 8B. In another embodiment, the optimization algorithm may be a Gaussian process-based optimization 812, as exemplary illustrated in 8C.

Figure 9A:
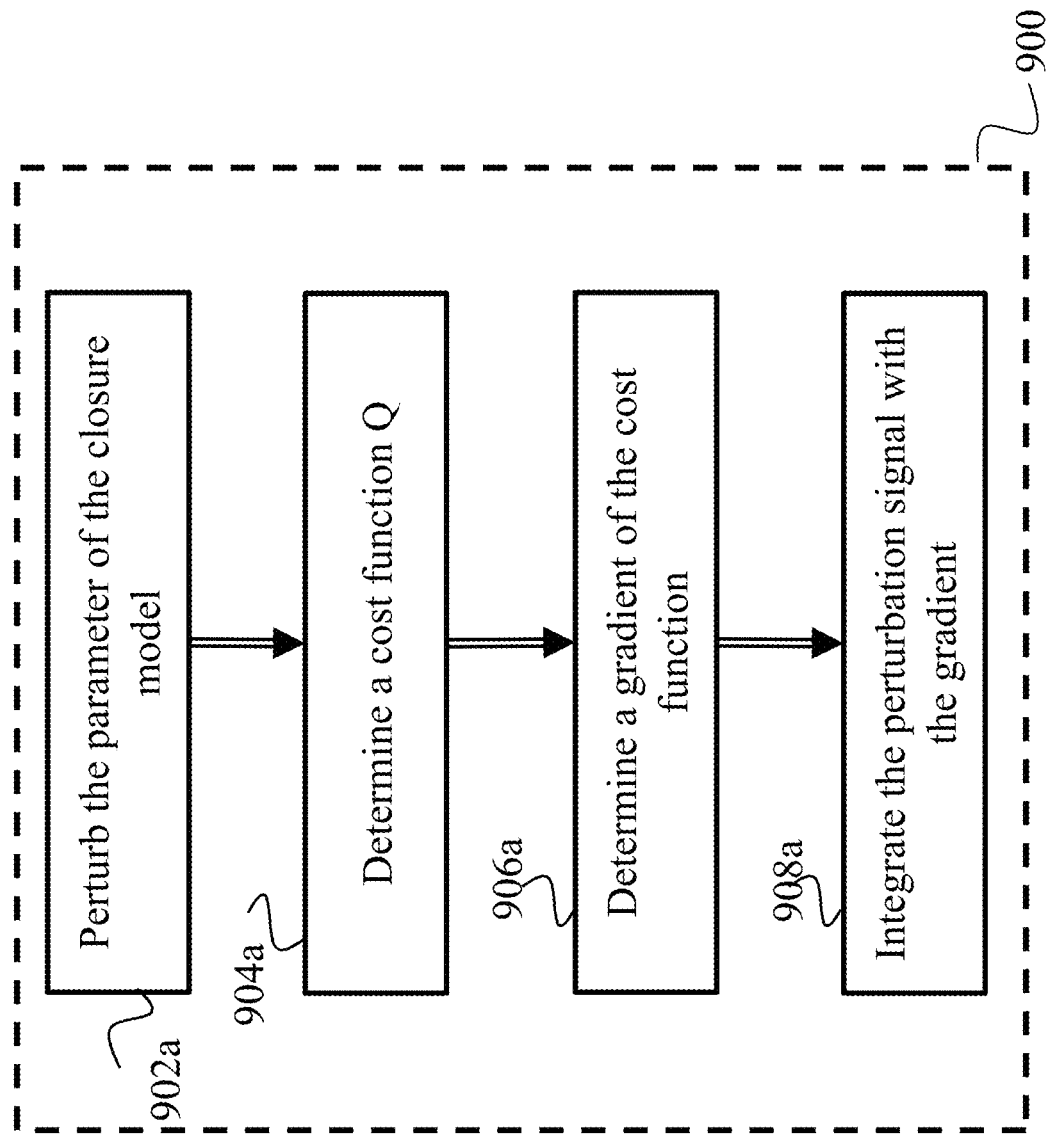
FIG. 9A shows a flowchart of an extremum seeking (ES) algorithm for updating a gain, according to some embodiments.

FIG. 9A shows a flowchart of an extremum seeking (ES) algorithm 900 for updating the gain, according to some embodiments. Some embodiments are based on recognition that the ES algorithm 900 is a model-free learning algorithm that allows the apparatus 200 to tune the gain of the optimal closure model. Some embodiments are based on realization that the ES algorithm 900 iteratively perturbs the gain of the optimal closure module with a perturbation signal until a termination condition is met. In some embodiments, the perturbation signal may be a periodic signal with a predetermined frequency. In some embodiments, the termination condition may be a condition where the gap 606 may be within a threshold limit. The gain of the optimal closure model may be a control parameter.

At step 902a, the ES algorithm 900 may perturb the control parameter of the optimal closure model. For instance, the ES algorithm 900 may use the perturbation signal to perturb the control parameter. In some embodiments, the perturbation signal may be a previous updated perturbation signal. At step 904a, the ES algorithm 900 may determine the cost function Q for the closure model performance in response to perturbing the control parameter. At step 906a, the ES may determine a gradient of the cost function by modifying the cost function with the perturbation signal. For instance, the gradient of the cost function is determined as a product of the cost function, the perturbation signal and a gain of the ES algorithm 900. At step 908a, the ES algorithm 900 may integrate the perturbation signal with the determined gradient to update the perturbation signal for next iteration. The iteration of the ES 900 can be repeated until the termination condition is met.

Figure 9B:
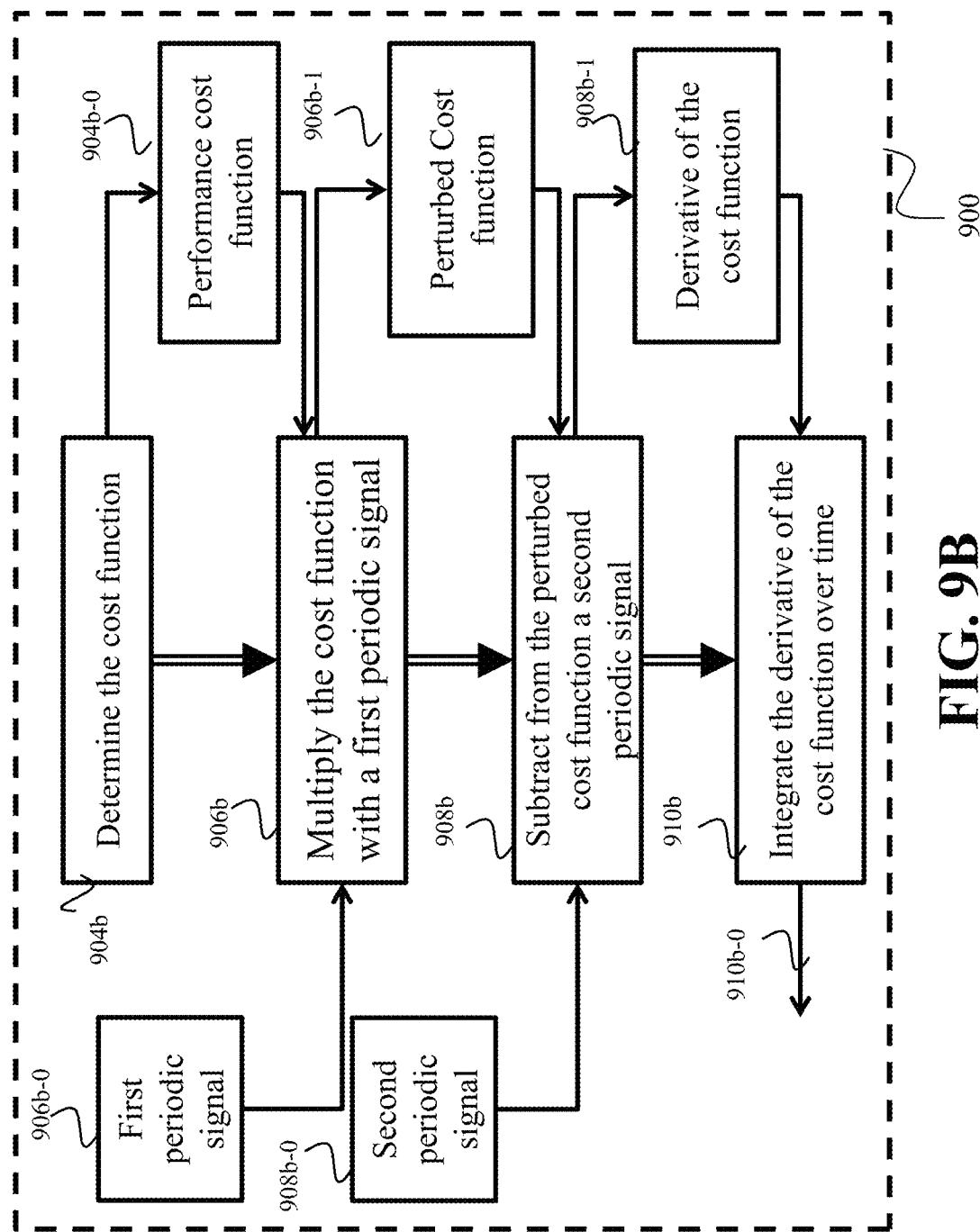
FIG. 9B shows a flowchart of an extremum seeking (ES) algorithm that uses performance cost function for updating the gain, according to some embodiments.

FIG. 9B shows a flowchart of extremum seeking (ES) algorithm 900 that uses performance cost function for updating the gain, according to some embodiments. At step 904b, the ES 900 may determine the cost function for the closure model performance. In some embodiments, the ES algorithm 900, at step 904b, determines the cost function as exemplary illustrated in step 904a of FIG. 9A. In some embodiments, the determined cost function may be a performance cost function 904b-0. According to some example embodiments, the performance cost function 904b-0 may be a quadratic equation representing a behavior of the gap 606.

At step 906b, the ES algorithm 900 may multiply the determined cost function with a first periodic signal 906b-0 of time to produce a perturbed cost function 906b-1. At step 908b, the ES algorithm 900 may subtract from the perturbed cost function 906b-1 a second periodic signal 908b-0 having a ninety degree quadrature phase shift with respect to a phase of the first periodic signal 906b-0 to produce a derivative of the cost function 908b-1. At step 910b, the ES algorithm 900 may integrate the derivative of the cost function 908b-1 over time to produce control parameter values 910b-0 as a function of time.

Figure 10:
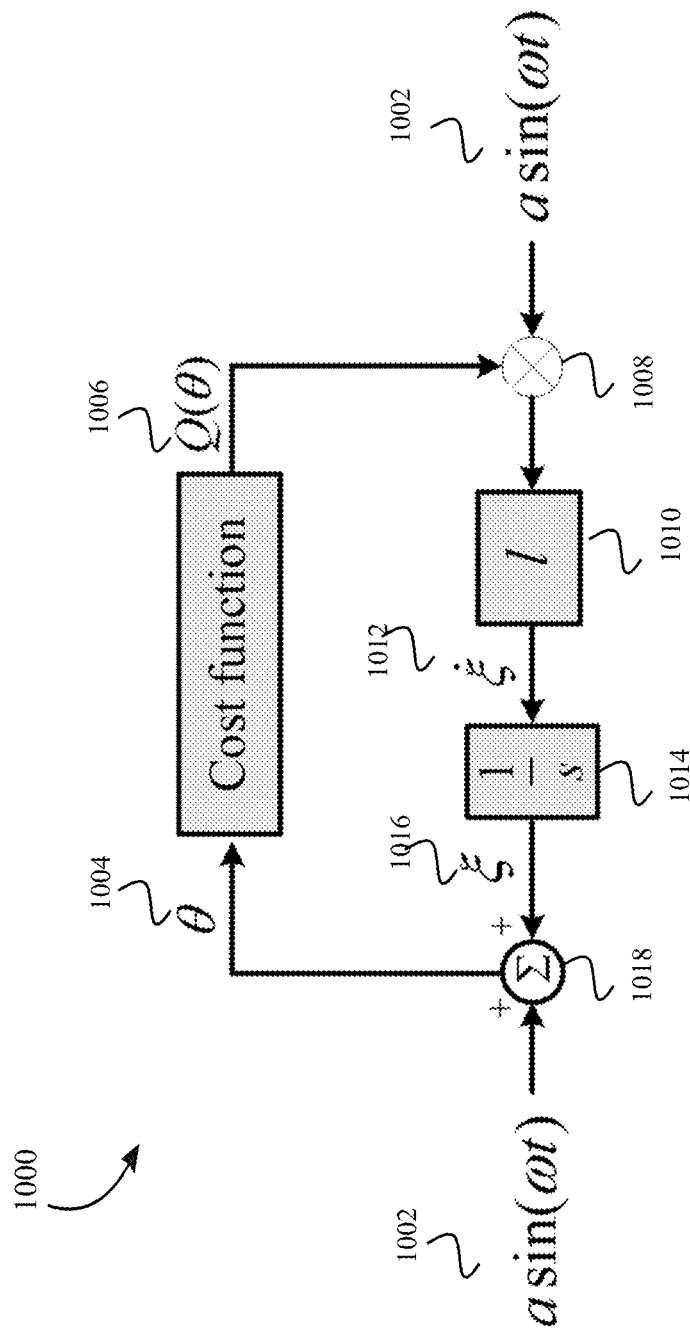
FIG. 10 shows a schematic of an extremum seeking (ES) controller for single parameter tuning, according to some embodiments.

FIG. 10 shows a schematic of an extremum seeking (ES) controller 1000 for single parameter tuning, according to some embodiments. The ES controller 1000 injects a sinusoidal perturbation signal a sin($\omega$t) 1002 to perturb a control parameter $\theta$1004. The ES controller 1000 determines the cost function Q($\theta$)1006 for the closure model performance, in response to perturbing the control parameter $\theta$1004. The ES controller 1000 multiplies the determined cost function Q($\theta$)1006 with the sinusoidal perturbation signal a sin($\omega$t) 1002 using a multiplier 1008. Further, the ES controller multiplies the resulting signal obtained from the multiplier 1008 with a gain l 1010 of the ES to form an estimate of the gradient $\dot{\xi}$ 1012 of the cost function Q($\theta$)1006. The ES controller 1000 passes the estimated gradient $\dot{\xi}$ 1012 through an integrator 1/s 1014 to produce a parameter $\xi$ 1016. The parameter $\xi$ 1016 is added to the sinusoidal perturbation signal a sin($\omega$t)1002 using a summer 1018 to modulate the sinusoidal perturbation signal a sin($\omega$t)1002 for next iteration. The iteration of the ES controller 100 can be repeated until the termination condition is met.

Figure 11:
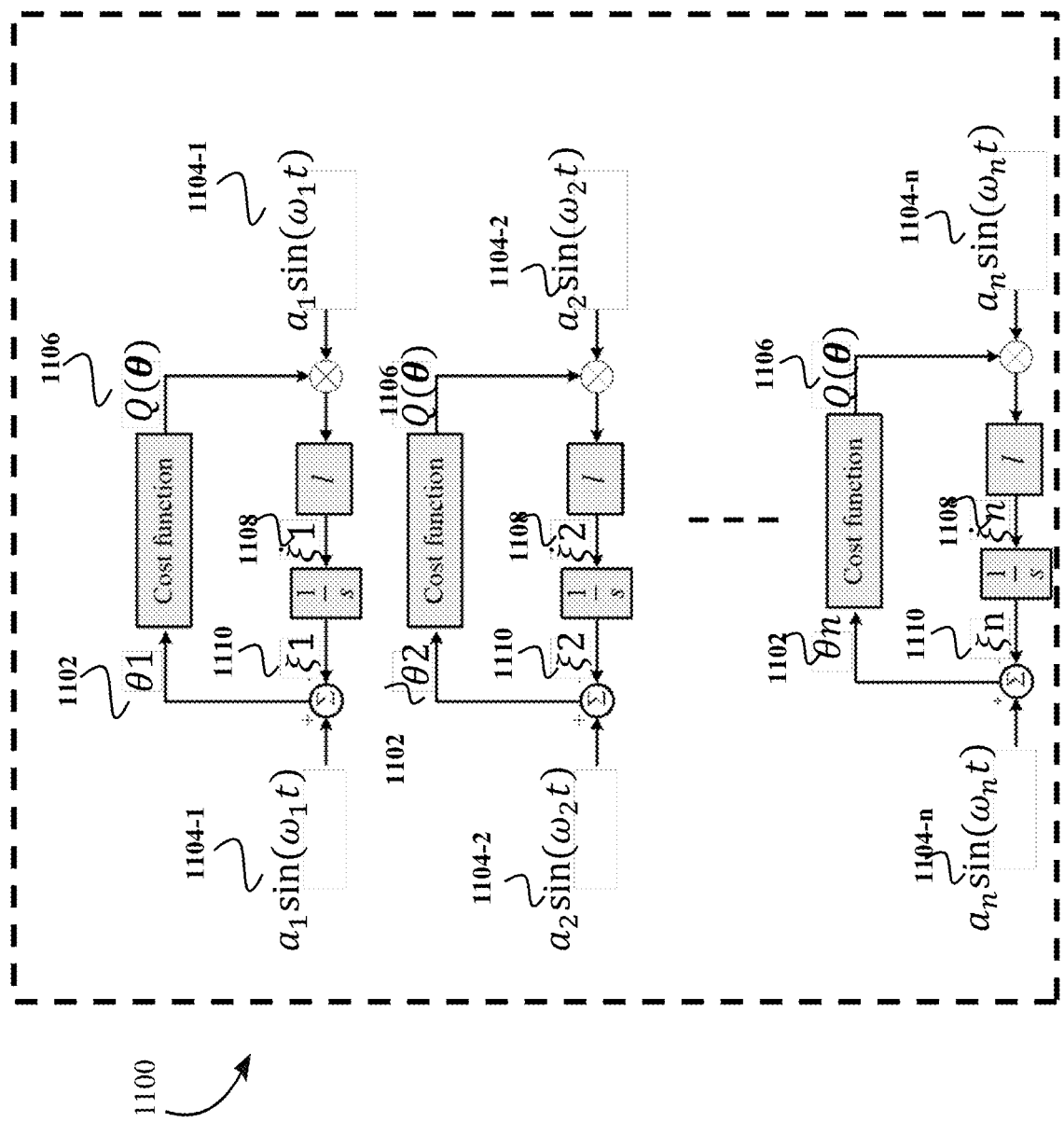
FIG. 11 shows a schematic of an extremum seeking (ES) controller for multiple parameters tuning, according to some embodiments.

FIG. 11 shows a schematic of an extremum seeking (ES) controller 1100 for multiple parameters tuning, according to some embodiments. Some embodiments are based on realization that the multi-parameter ES controller 1100 is derived from the single-parameter ES 1000. For instance, the single-parameter ES controller 1000 may be n times duplicated to obtain an n-parameter ES controller 1100. Some embodiments are based on recognition that the n-parameter ES controller 1100 perturbs a set of n control parameters $\theta_i$ 1102 with corresponding n perturbation signals 1104-1 to 1104-n having n different frequencies to update the optimal closure model. In some embodiments, each of the n different frequencies is greater than a frequency response of the system 102. In addition, the n different frequencies of the n perturbation signals 1104-1 to 1104-n satisfy a condition of convergence, such that a sum of a first frequency of a first perturbation signal 1104-1 and a second frequency of a second perturbation signal 1104-2 of the set is not equal to a third frequency of a third perturbation signal 1104-3.

Further, each of the n control parameter $\theta_i$ 1102 can be updated as explained in detail description of FIG. 10. To that end, the n-parameter ES controller 1100 comprises n control parameters $\theta_i$ 1102, n perturbation signals 1104-1 to 1104-n, n estimated gradients 1108 $\hat{\xi}_i$, n parameters $\xi_i$ 1110 and one common cost function $Q(\theta)$ 1106, which is function of all estimated control parameters $\theta=(\theta_1, \ldots, \theta_n)^T$ 1102. In some embodiments, the multi-parameter ES 1100 may be mathematically defined as:

$$\dot{\xi}_i = a_i l \sin(\omega_i t) Q(\theta)$$

$$\theta_i = \xi_i + a_i \sin(\omega_i t)$$

where the perturbation frequencies $\omega_i$ are such that $\omega_i \neq \omega_j$, $\omega_i + \omega_j \neq \omega_k$, i, j, k, $\in \{1, 2, \ldots, n\}$, and $\omega_i > \omega^*$, with $\omega^*$ large enough to ensure the convergence. In some embodiments, when the parameters $a_i$, $\omega_i$, and l are properly selected, the cost function $Q(\theta)$ 1106 converges to an neighborhood of an optimal cost function $Q(\theta^*)$.

In order to implement the multi-parameter ES controller 1100 in the real-time embedded system 102, a discrete version of the multi-parameter ES controller 1100 is advantageous. For instance, the discrete version of the multi-parameter ES controller 1100 may be mathematically represented as:

$$\xi_i(k+1) = \xi_i(k) + a_i l \Delta T \sin(\omega_i k) Q(\theta(k))$$

$$\theta_i(k+1) = \xi_i(k+1) + a_i \sin(\omega_i(k))$$

where k is the time step and $\Delta T$ is the sampling time.

As should be understood, once the control parameter $\theta$ (i.e. the positive gain) is updated, using the ES algorithm or the Gaussian process-based optimization, in the optimal closure model, the optimal closure model in combination with ODE 406 mimics the actual behavior 602 of the system 102. For instance, the estimated behavior 604 may be qualitatively and quantitatively similar to the actual behavior 602 without the gap 606.

To that end, the optimal reduced model 406 comprising the ODE and the optimal closure model with the updated gain may be used to determine the control command. In some embodiments, the optimal reduced model 406 comprising the ODE, the optimal closure model with the updated gain may develop the control policies 106 for the system 102. The control policies 106 may directly map the state of the system 102 to the states of the system 102 to the control commands to control the operation of the system 102. Examples of control command includes, in case the system 102 being the HAVC system, position valves, speed of compressor, parameters of evaporator, and the like. Examples of control command includes, in case the system 102 being a rotor, speed of the rotor, temperature of a motor, and the like. Further, the control command may be transmitted, via the output interface 218, to actuators of the system 102 to control the system 102. Some embodiments are based on recognition that the operation of the system 102 is subjected to constraints. The constraints may include state constraints in continuous state space of the system 102 and control input constraints in continuous control input space of the system 102. Further, the apparatus 200 for controlling the operation subjected to constraints is explained in detail description of FIG. 12.

Figure 12:
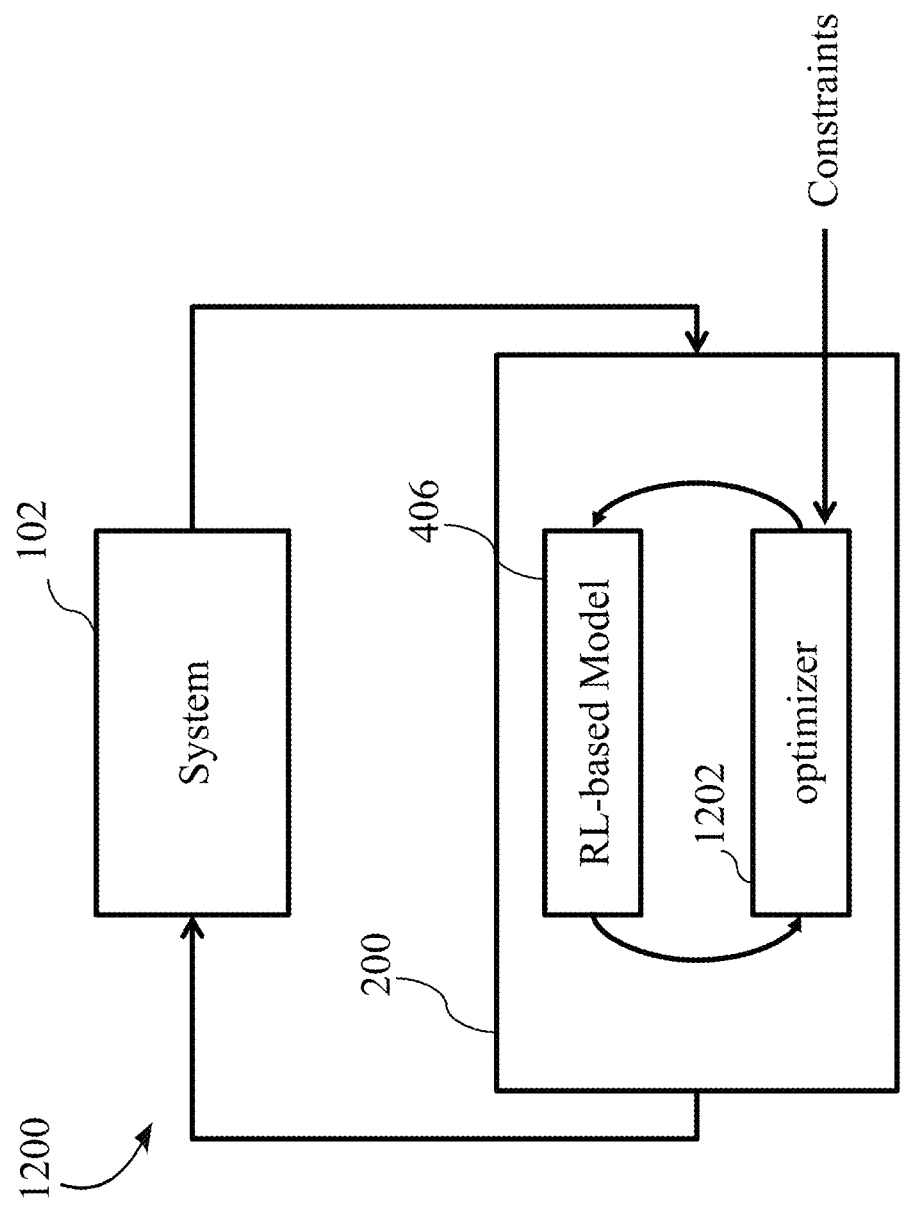
FIG. 12 shows a predictive model based algorithm for considering constraints to control the system, according to some embodiments.

FIG. 12 shows a predictive model based algorithm 1200 for considering the constraints to control the system 102, according to some embodiments. Some embodiments are based on recognition that classic RL methods are not suitable for data-driven control of the constrained system 102. For instance, the classic RL methods do not consider state and input constraint satisfaction in continuous state-action spaces; that is, the classic RL methods cannot guarantee that the states of the controlled system 102 operated with control inputs satisfy state and input constraints throughout the operation. However, some embodiments are based on realization that the RL methods allow the data-driven advantages of the RL to combine with model based constrained optimization.

To that end, some embodiments use the RL-based model (for instance, the optimal reduced order model 406) of the system 102 determined by the data-driven adaptation in various predictive model based algorithms. In some embodiments, an optimizer 1202 is formulated to consider the constraints to control the system 102. Some embodiments are based on realization that the optimizer 1202 may be a model predictive control algorithm (MPC). The MPC is a control method that is used to control the system 102, while enforcing the constraints. To that end, some embodiments take the advantage of the MPC to consider the constraints in control of the system 102. Further, the real-time implementation of the apparatus 200 to control the system 102 is explained in detailed description of FIG. 13-15.

Figure 13:
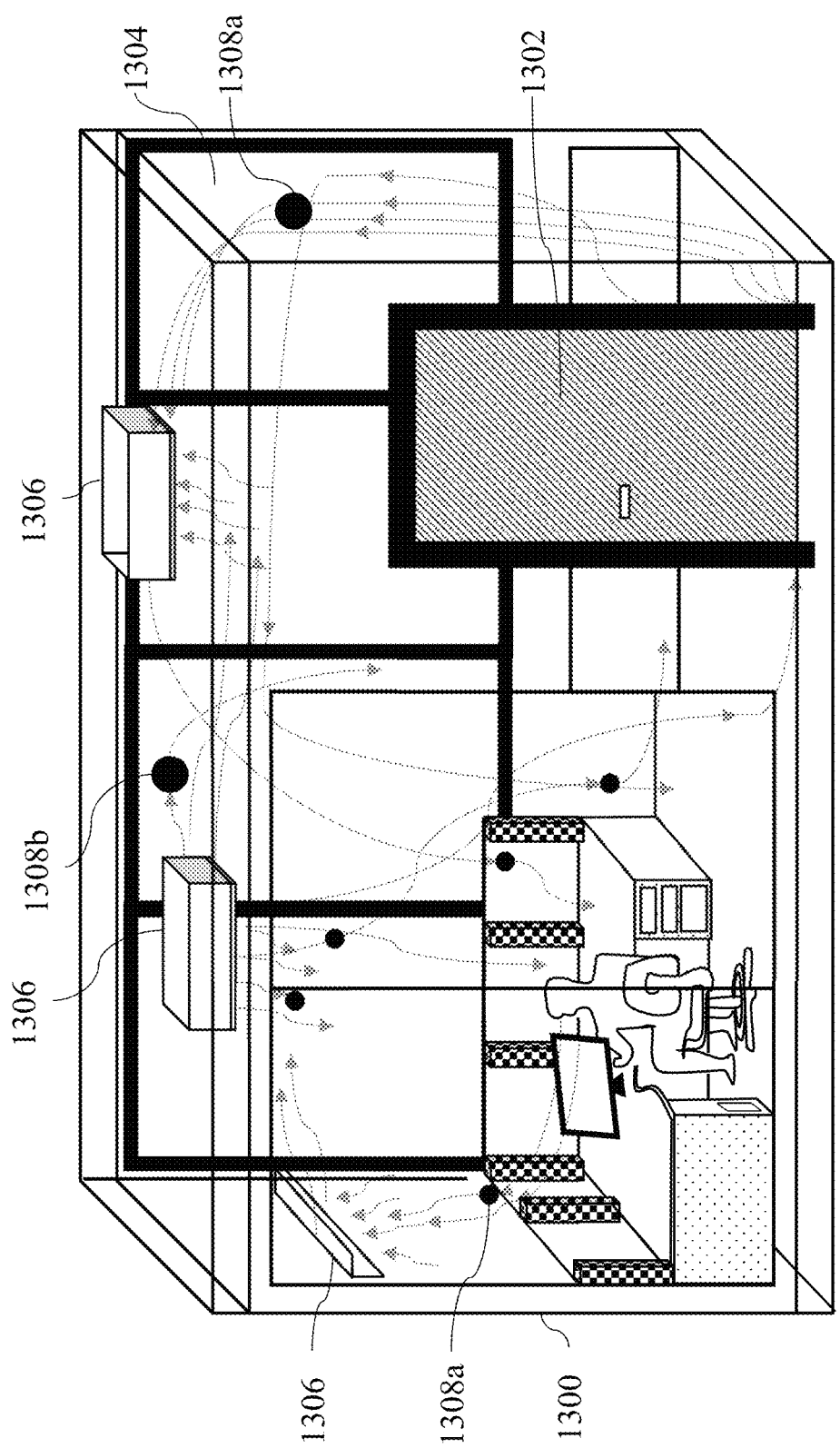
FIG. 13 shows an exemplary real-time implementation of the apparatus for controlling the system, wherein the system is an air-conditioning system.

FIG. 13 shows an exemplary real-time implementation of the apparatus 200 for controlling the system 102, wherein the system 120 is an air-conditioning system. In this example, a room 1300 has a door 1302 and at least one window 1304. The temperature and the airflow of the room 1300 are controlled by the apparatus 200 via an air-conditioning system 102 through ventilation units 1306. A set of sensors 1308 is arranged in the room 1300, such as at least one airflow sensor 1308a for measuring velocity of the air flow at a given point in the room 1300, and at least one temperature sensor 1308b for measuring the room temperature. Other type of setting can be considered, for example a room with multiple HVAC units, or a house with multiple rooms.

Some embodiments are based on recognition that the air-conditioning system 102 can be described by the physics-based model called the Boussinesq equation, as exemplary illustrated in FIG. 3. However, the Boussinesq equation contains infinite dimensions to resolve the Boussinesq equation for controlling the air-conditioning system 102. To that end, the model comprising the ODE 402 and the updated closure model with the updated gain is formulated as explained in detail description of FIGS. 1-12. The model reproduces the dynamics (for instance, an airflow dynamics) of the air-conditioning system 102 in an optimal manner. Further, in some embodiments, the model of the air flow dynamics connects the values of the air flow (for instance, the velocity of the air flow) and the temperature of the air conditioned room 1300 during the operation of the air-conditioning system 102. To that end, the apparatus 200 optimally controls the air-conditioning system 102 to generate the airflow in a conditioned manner.

Figure 14A:
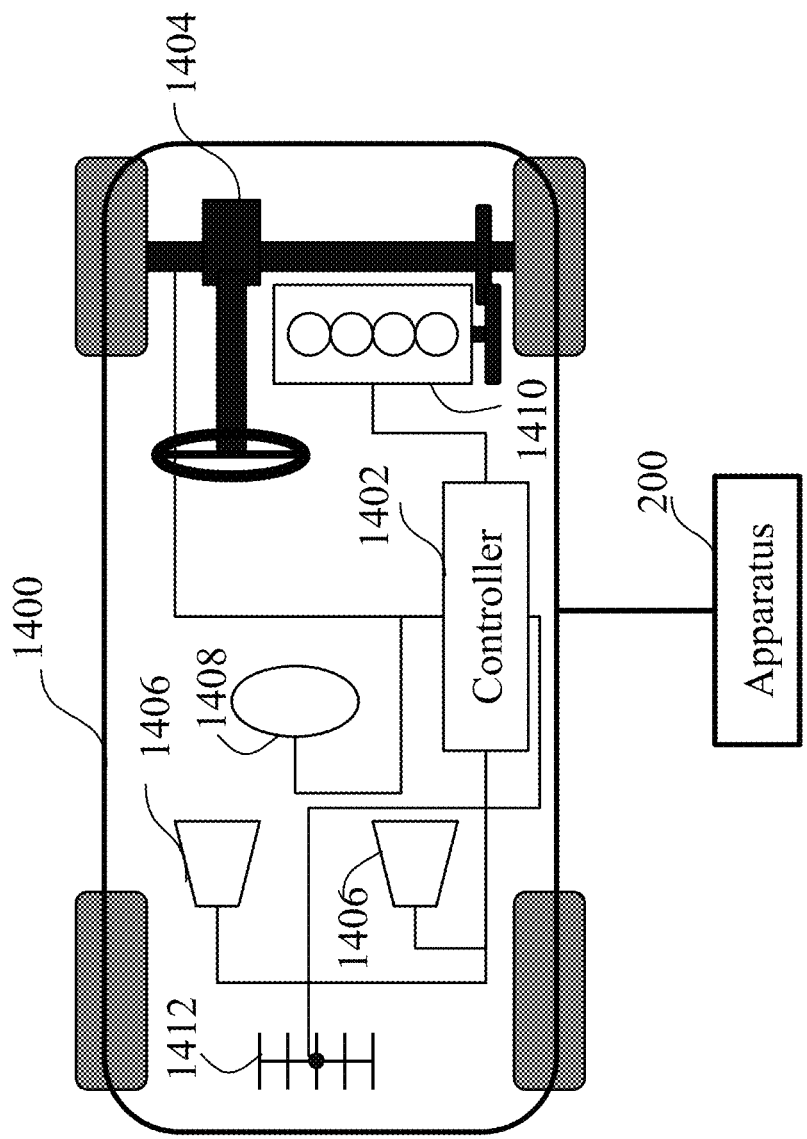
FIG. 14A shows an exemplary real-time implementation of the apparatus for controlling the system, wherein the system is a vehicle.

FIG. 14A shows an exemplary real-time implementation of the apparatus 200 for controlling the system 102, wherein the system 120 is a vehicle 1400. The vehicle 1400 may be any type of wheeled vehicle, such as a passenger car, bus, or rover. Also, the vehicle 1400 can be an autonomous or semi-autonomous vehicle. For example, some embodiments control the motion of the vehicle 1400. Examples of the motion include lateral motion of the vehicle controlled by a steering system 1404 of the vehicle 1400. In one embodiment, the steering system 1404 is controlled by the controller 1402. Additionally, or alternatively, the steering system 1404 may be controlled by a driver of the vehicle 1400.

In some embodiments, the vehicle may include an engine 1410, which can be controlled by the controller 1402 or by other components of the vehicle 1400. In some embodiments, the vehicle may include an electric motor in place of the engine 1410 and can be controlled by the controller 1402 or by other components of the vehicle 1400. The vehicle can also include one or more sensors 1406 to sense the surrounding environment. Examples of the sensors 1406 include distance range finders, such as radars. In some embodiments, the vehicle 1400 includes one or more sensors 1408 to sense its current motion parameters and internal status. Examples of the one or more sensors 1408 include global positioning system (GPS), accelerometers, inertial measurement units, gyroscopes, shaft rotational sensors, torque sensors, deflection sensors, pressure sensor, and flow sensors. The sensors provide information to the controller 1402. The vehicle may be equipped with a transceiver 1412 enabling communication capabilities of the controller 1402 through wired or wireless communication channels with the apparatus 200 of some embodiments. For example, through the transceiver 1412, the controller 1402 receives the control commands from the apparatus 200. Further, the controller 1402 outputs the received control command to one or more actuators of the vehicle 1400, such as the steering wheel and/or the brakes of the vehicle, in order to control the motion of the vehicle.

Figure 14B:
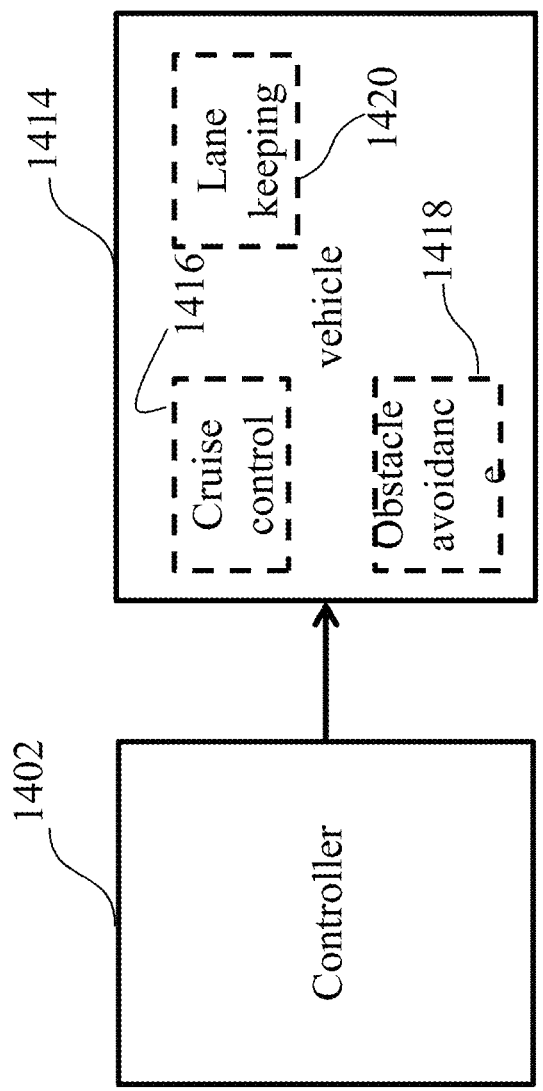
FIG. 14B shows a schematic of interaction between a controller and controllers of the vehicle, according to some embodiments.

FIG. 14B shows a schematic of interaction between the controller 1402 and controllers 1414 of the vehicle 1400, according to some embodiments. For example, in some embodiments, the controllers 1414 of the vehicle 1400 are a cruise control 1414 and obstacle avoidance 1418 that control rotation and acceleration of the vehicle 1400. In such a case, the controller 1402 outputs control commands to the controllers 1416 and 1418 to control the kinematic state of the vehicle. In some embodiments, the controllers 1414 also include high-level controllers, e.g. a lane keeping controller 1420 that further process the control commands of the controller 1402. In both cases, the controllers 1414 utilize the output of the controller 1402 i.e. control commands to control at least one actuator of the vehicle, such as the steering wheel and/or the brakes of the vehicle, in order to control the motion of the vehicle. In some embodiments, the motion of the vehicle 1400 may be subjected to the constraints. The constraints are taken in consideration as explained in detail description of FIG. 12. The constraints may include state constraints in continuous state space of the vehicle 1400 and control input constraints in continuous control input space of the vehicle 1400. In some embodiments, the state of the vehicle 1400 include one or combination of a position, an orientation, and a longitudinal velocity, and a lateral velocity of the vehicle 1400. The state constraints include one or combination of velocity constraints, lane keeping constraints, and obstacle avoidance constraints.

In some embodiments, the control inputs include one or combination of a lateral acceleration, a longitudinal acceleration, a steering angle, an engine torque, and a brake torque. The control input constraints include one or combination of steering angle constraints, and acceleration constraints.

Figure 15:
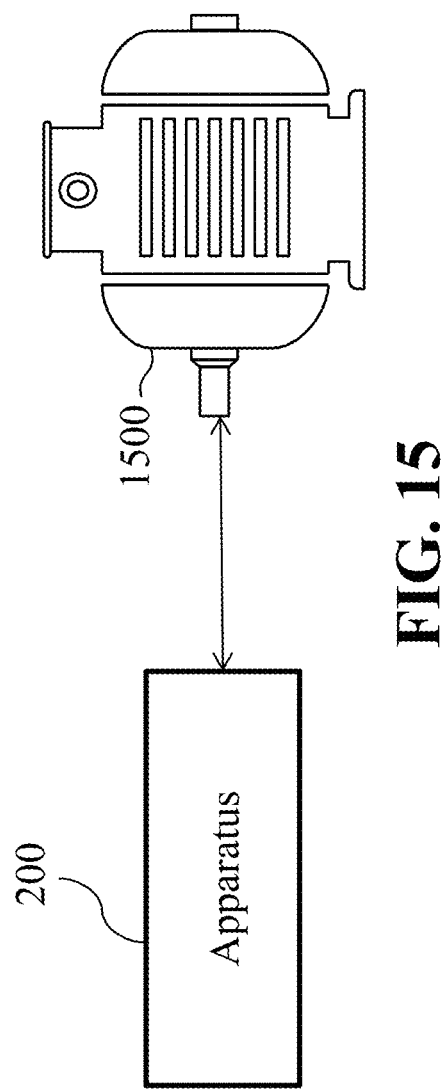
FIG. 15 shows an exemplary real-time implementation of the apparatus for controlling the system, wherein the system is an induction motor.

FIG. 15 shows an exemplary real-time implementation of the apparatus 200 for controlling the system 102, wherein the system 120 is an induction motor 1500. In this example, the induction motor 1500 is integrated with the apparatus 200. The apparatus is configured to control the operation of the induction motor 1500 as explained in detail description of FIG. 1-12. In some embodiments, the operation of the induction motor 1500 may be subjected to the constraints. The constraints include state constraints in continuous state space of the induction motor 1500 and control input constraints in continuous control input space of the induction motor 1500. In some embodiments, the state of the motor 1500 includes one or combination of a stator flux, a line current, and a rotor speed. The state constraints include constraints on values of one or combination of the stator flux, the line current, and the rotor speed. In some embodiments, the control inputs include values of an excitation voltage. The control input constraints include a constraint on the excitation voltage.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. An apparatus for controlling an operation of a system, comprising:
    an input interface configured to receive a state trajectory of the system;
    a memory configured to store a model of dynamics of the system including a combination of at least one differential equation and a closure model;
    a processor configured to:
        update the closure model using reinforcement learning (RL) having a value function that reduces a difference between a shape of the received state trajectory and a shape of state trajectory estimated using the model with the updated closure model; and
        determine a control command based on the model with the updated closure model; and
    an output interface configured to transmit the control command to an actuator of the system to control the operation of the system.

2. The apparatus of claim 1, wherein the differential equation of the model defines a reduced order model of the system having a number of parameters less than a physical model of the system according to a partial differential equation (PDE), and wherein the reduced order model is an ordinary differential equation (ODE), wherein the updated closure model is a nonlinear function of a state of the system capturing a difference in behavior of the system according to the ODE and the PDE.

3. The apparatus of claim 2, wherein the partial differential equation (PDE) is a Boussinesq equation.

4. The apparatus of claim 1, wherein the processor is configured to initialize the closure model with a linear function of the state of the system and update the closure model iteratively with the RL until a termination condition is met.

5. The apparatus of claim 1, wherein the updated closure model includes a gain, wherein the processor is configured to determine the gain reducing an error between a state of the system estimated with the model having the updated closure model with the updated gain and an actual state of the system.

6. The apparatus of claim 5, wherein the actual state of the system is a measured state.

7. The apparatus of claim 5, wherein the actual state of the system is a state estimated with a partial differential equation (PDE) describing dynamics of the system.

8. The apparatus of claim 5, wherein the processor updates the gain using an extremum seeking.

9. The apparatus of claim 5, wherein the processor updates the gain using a Gaussian process-based optimization.

10. The apparatus of claim 1, wherein the operation of the system is subject to constraints, wherein the RL updates the closure model without considering the constraints, and wherein the processor determines the control command using the model with the updated closure model subject to the constraints.

11. The apparatus of claim 10, wherein the constraints include state constraints in continuous state space of the system and control input constraints in continuous control input space of the system.

12. The apparatus of claim 10, wherein the processor uses a predictive model based control to determine the control command while enforcing the constraints.

13. The apparatus of claim 11, wherein the system is a vehicle controlled to perform one or combination of a lane keeping, a cruise control, and an obstacle avoidance operation,
    wherein the state of the vehicle includes one or combination of a position, an orientation, and a longitudinal velocity, and a lateral velocity of the vehicle,
    wherein the control inputs include one or combination of a lateral acceleration, a longitudinal acceleration, a steering angle, an engine torque, and a brake torque,
    wherein the state constraints include one or combination of velocity constraints, lane keeping constraints, and obstacle avoidance constraints, and
    wherein the control input constraints include one or combination of steering angle constraints, and acceleration constraints.

14. The apparatus of claim 11, wherein the system is an induction motor controlled to perform a task,
    wherein the state of the motor includes one or combination of a stator flux, a line current, and a rotor speed,
    wherein the control inputs include values of excitation voltage,
    wherein the state constraints include constraints on values of one or combination of the stator flux, the line current, and the rotor speed,
    wherein the control input constraints include a constraint on the excitation voltage.

15. The apparatus of claim 1, wherein the system is an air-conditioning system generating airflow in a conditioned environment, wherein the model is a model of airflow dynamics connecting values of flow and temperature of air conditioned during the operation of the air-conditioning system.

16. The apparatus of claim 1, wherein the RL uses a neural network trained to minimize the value function.

17. A method for controlling an operation of a system, wherein the method uses a processor coupled to a memory storing a model of dynamics of the system including a combination of at least one differential equation and a closure model, the processor is coupled with stored instructions when executed by the processor carry out steps of the method, comprising:
    receiving a state trajectory of the system;
    updating the closure model using reinforcement learning (RL) having a value function that reduces a difference between a shape of the received state trajectory and a shape of state trajectory estimated using the model with the updated closure model;

determining a control command based on the model with the updated closure model; and transmitting the control command to an actuator of the system to control the operation of the system.

18. The method of claim 17, wherein the differential equation of the model defines a reduced order model of the system having a number of parameters less than a physical model of the system according to a Boussinesq equation, wherein the Boussinesq equation is a partial differential equation (PDE), and wherein the reduced order model is an ordinary differential equation (ODE), wherein the updated closure model is a nonlinear function of a state of the system capturing a difference in behavior of the system according to the ODE and the PDE.

19. The method of claim 17, wherein the updated closure model includes a gain, wherein the method further comprising determining the gain reducing an error between a state of the system estimated with the model having the updated closure model with the updated gain and an actual state of the system.

20. The method of claim 17, wherein the operation of the system is subject to constraints, wherein the RL updates the closure model without considering the constraints, and wherein the method further comprising determining the control command using the model with the updated closure model subject to the constraints.

* * * * *